(12) United States Patent
Falk

(10) Patent No.: US 12,130,833 B2
(45) Date of Patent: Oct. 29, 2024

(54) BLOCK FORMATION DEVICE AND BLOCK FORMATION METHOD, NODE DEVICE AND BLOCK CONFIRMATION METHOD

(71) Applicant: Siemens Aktiengesellschaft, Munich (DE)

(72) Inventor: Rainer Falk, Poing (DE)

(73) Assignee: Siemens Aktiengesellschaft, Munich (DE)

( * ) Notice: Subject to any disclaimer, the term of this patent is extended or adjusted under 35 U.S.C. 154(b) by 535 days.

(21) Appl. No.: 17/269,633

(22) PCT Filed: Aug. 22, 2019

(86) PCT No.: PCT/EP2019/072432
§ 371 (c)(1),
(2) Date: Feb. 19, 2021

(87) PCT Pub. No.: WO2020/043581
PCT Pub. Date: Mar. 5, 2020

(65) Prior Publication Data
US 2021/0342363 A1 Nov. 4, 2021

(30) Foreign Application Priority Data
Aug. 31, 2018 (EP) .................................. 18192002

(51) Int. Cl.
*G06F 7/02* (2006.01)
*G06F 1/14* (2006.01)
(Continued)

(52) U.S. Cl.
CPC ................ *G06F 16/27* (2019.01); *G06F 1/14* (2013.01); *G06F 16/2358* (2019.01); *H04L 9/3236* (2013.01); *H04L 9/50* (2022.05)

(58) Field of Classification Search
CPC ...... G06F 16/27; G06F 16/2358; G06F 21/64; G06F 1/14; H04L 9/0637; H04L 9/3236; H04L 9/50
See application file for complete search history.

(56) References Cited

U.S. PATENT DOCUMENTS

2016/0292672 A1 10/2016 Fay et al.
2017/0005804 A1 1/2017 Zinder
(Continued)

FOREIGN PATENT DOCUMENTS

CN 107615317 A 1/2018
CN 107924389 A 4/2018
(Continued)

OTHER PUBLICATIONS

Diedrich, Henning "Ethereum: Blockchains, Digital Assets, Smart Contracts, Decentralized Autonomous Organizations" CreateSpace Independent Publishing Platform, Sep. 8, 2016 // ISBN-10: 1523930470 // ISBN-13: 978-1523930470.
(Continued)

*Primary Examiner* — Bruce M Moser
(74) *Attorney, Agent, or Firm* — Schmeiser, Olsen & Watts LLP

(57) ABSTRACT

A block formation device and to a node device for a distributed database system, each having a unit for receiving a timing clock pulse from a time source and determining time slices of prescribed length on the basis of the timing clock pulse is provided. The block formation device is configured to select transactions to be confirmed precisely once within a respective time slice from unconfirmed transactions provided in the database system, to form an unconfirmed block from the selected unconfirmed transactions and to provide the unconfirmed block in the database system. The node device is configured to store a chain of confirmed blocks representing a transaction log of the database system;

(Continued)

and, within a respective time slice, to confirm precisely one from unconfirmed blocks provided in the database system in the time slice precisely once and to add it to the chain of confirmed blocks.

15 Claims, 6 Drawing Sheets

(51) Int. Cl.
| | |
|---|---|
| *G06F 16/00* | (2019.01) |
| *G06F 16/23* | (2019.01) |
| *G06F 16/27* | (2019.01) |
| *H04L 9/32* | (2006.01) |
| *H04L 9/00* | (2022.01) |

(56) References Cited

U.S. PATENT DOCUMENTS

| | | | |
|---|---|---|---|
| 2017/0243208 | A1 | 8/2017 | Kurian et al. |
| 2019/0199535 | A1 | 6/2019 | Falk |
| 2020/0036729 | A1 | 1/2020 | Maneval |
| 2020/0366495 | A1* | 11/2020 | Mahoney ............ G06F 16/2379 |
| 2021/0203476 | A1* | 7/2021 | van de Ruit .......... H04L 9/3236 |
| 2021/0226986 | A1* | 7/2021 | Bartolucci ................ H04L 9/50 |
| 2023/0334036 | A1* | 10/2023 | Covaci ................... G06Q 20/04 |

FOREIGN PATENT DOCUMENTS

| | | |
|---|---|---|
| CN | 108011370 A | 5/2018 |
| DE | 102016215917 A1 | 3/2018 |
| DE | 102016118613 A1 | 4/2018 |

OTHER PUBLICATIONS

GitHub/ "The Ethereum Book Project/Mastering Ethereum" https://github.com/ethereumbook/ethereumbook, Stand May 10, 2017; 2017.

Baird Leemon: "The Swirlds Hashgraph Consensus Algorithm: Fair, Fast, Byzantine Fault Tolerance", Swirlds Tech Report SWIRLDS-TR-2016-01; 2016.

Androulaki Elli et al: "Hyperledger fabric: a distributed operating system for permissioned blockchains", Proceedings of the Thirteenth Eurosys Conference on Eurosys '18, Apr. 26, 2018 (Apr. 26, 2018), XP055554083, New York, New York, USA, DOI: 10.1145/3190508.3190538, ISBN: 978-1-4503-5584-1.

Anderson Ross: "Security Engineering. A Guide to Building Dependable Distributed Systems"; Wiley; Jan. 2001.

Antonopoulos Andreas M: "Mastering Bitcoin: Unlocking Digital Cryptocurrencies" O'Reilly, First edition discloses at section Transaction Age, Fees, and Priority; 2010.

Blockchainhub: "Blockchain Oracles", https://blockchainhub.net/blockchain-oracles/; 2018.

Needham Roger M et al: "Using encryption for authentication in large networks of computers", ACM: Communications of the ACM, vol. 21, No. 12, Dec. 1978; 1978.

Baird Leemon: "Overview of Swirlds Hashgraph", Swirlds; 2016.

PCT International Search Report dated Oct. 16, 2019 corresponding to PCT International Application No. PCT/EP2019/072432 filed Aug. 22, 2019.

Li Yue et al.; "DCI control model of digital works based on blockchain"; Oct. 11, 2017.

* cited by examiner

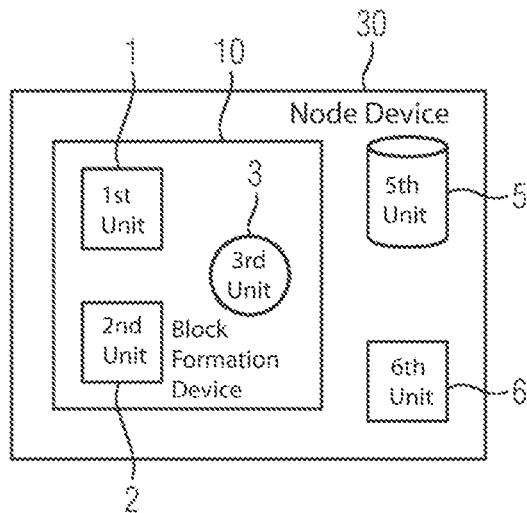
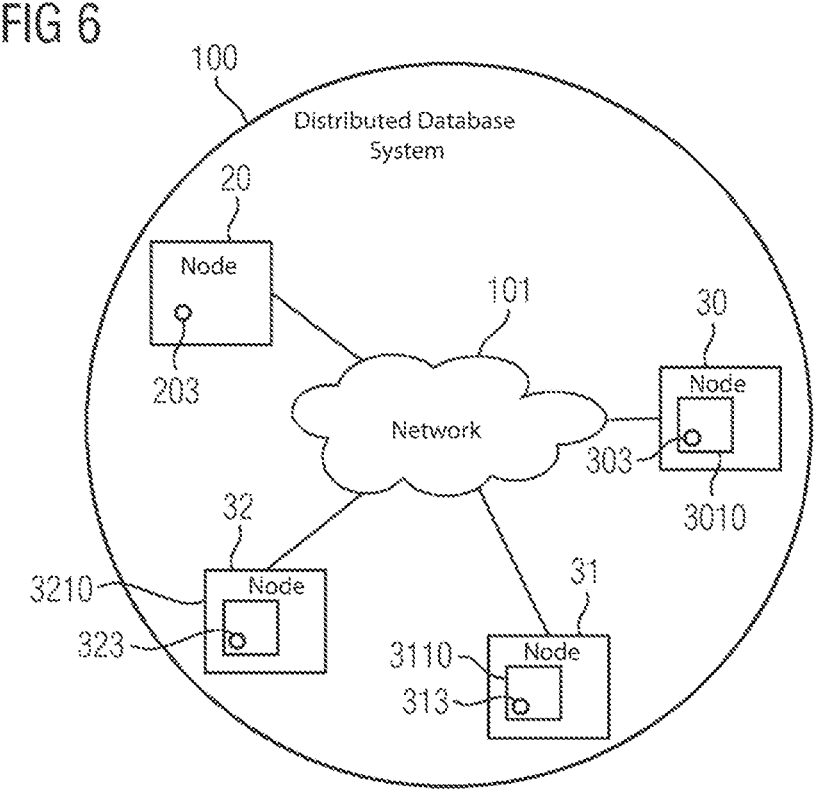

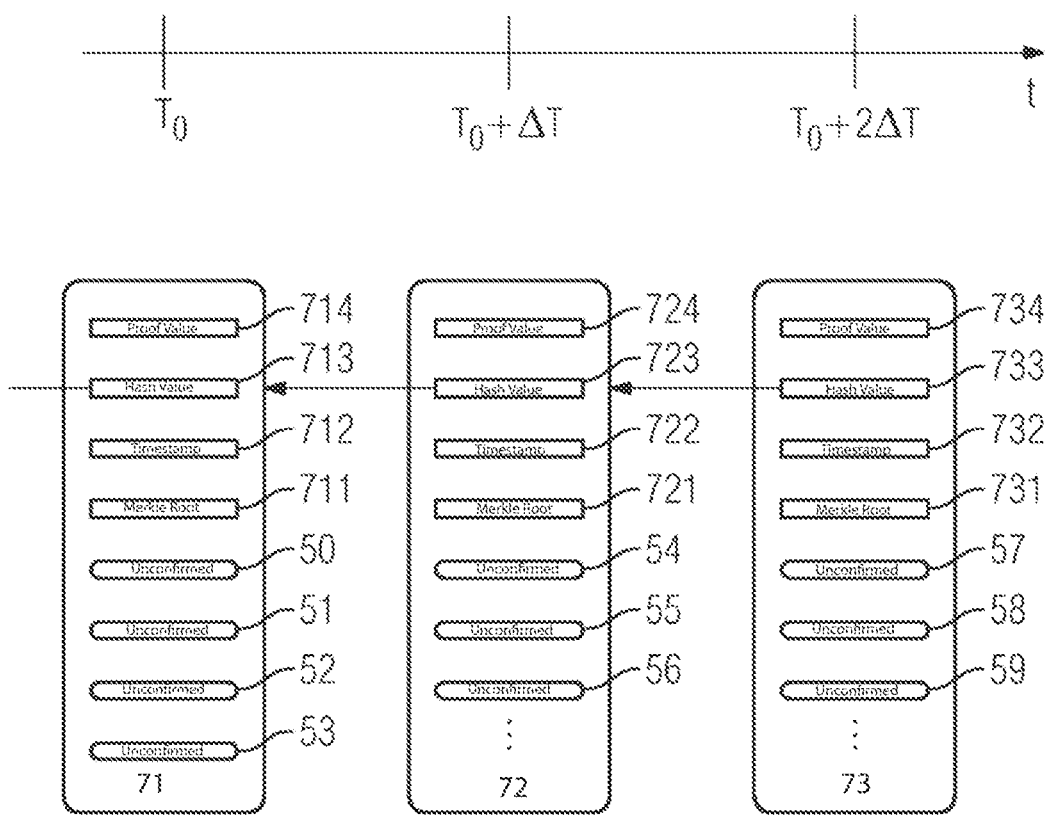

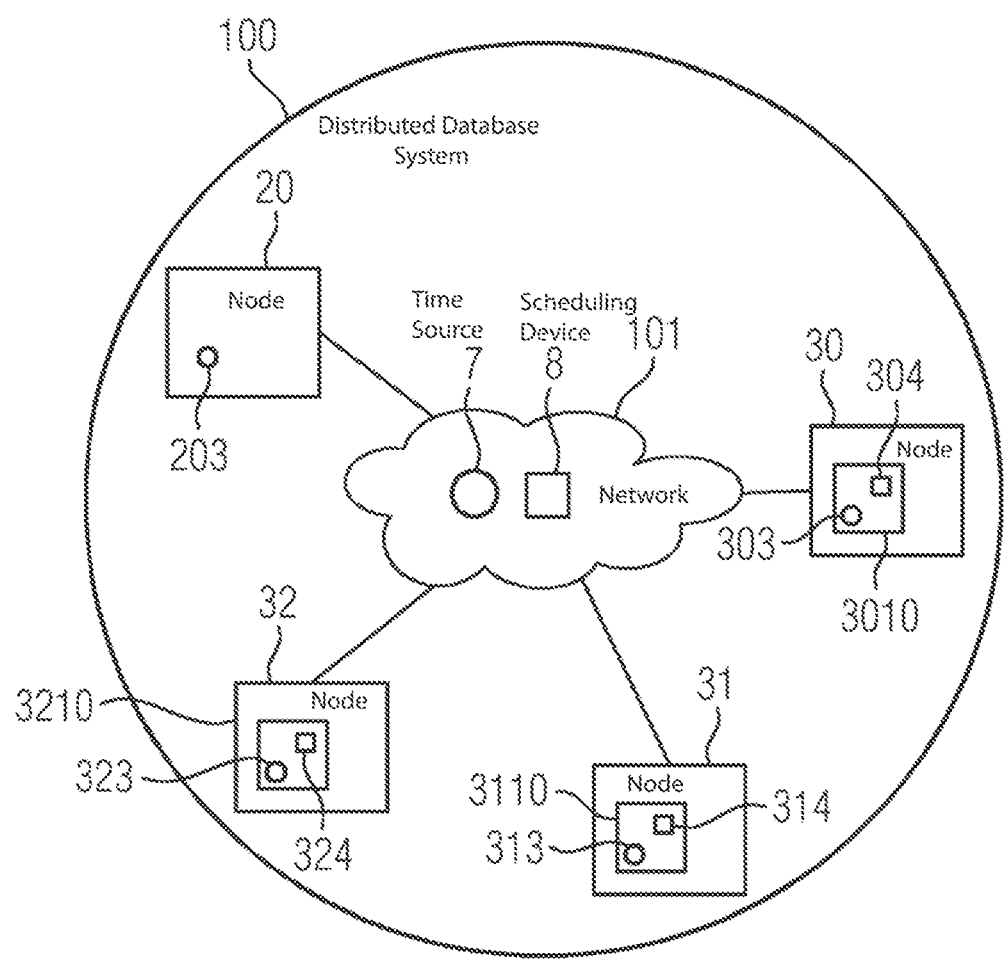

BLOCK FORMATION DEVICE AND BLOCK FORMATION METHOD, NODE DEVICE AND BLOCK CONFIRMATION METHOD

CROSS-REFERENCE TO RELATED APPLICATIONS

This application claims priority to PCT Application No. PCT/EP2019/072432, having a filing date of Aug. 22, 2019, which is based on EP Application No. 18192002.6, having a filing date of Aug. 31, 2018, the entire contents both of which are hereby incorporated by reference.

FIELD OF TECHNOLOGY

The following relates to the field of industrial automation engineering and specifically to a block formation device, a block formation method, a node device and a block confirmation method for a distributed database system using timing.

BACKGROUND

Industrial applications, such as industrial automation systems, make special demands on the information technology used for control or regulation in terms of functional safety, availability and real-time capability.

In a distributed database system implemented using blockchain technology, transactions without a clearing house or special relationship of trust between the parties to the transactions can be performed in manipulation-proof fashion on the basis of a consensus between the parties to the transactions. It is conceivable to store measured/control values and, for example as what are known as smart contracts, control commands for an industrial automation system in transaction data records protected by blockchain technology. However, known blockchain technology lacks the real-time capability required for industrial controllers. In particular, a proof-of-work-based blockchain can confirm transactions only on average in certain intervals, but it is not possible to predefine exactly at what times a transaction needs to be confirmed or a smart contract needs to be executed.

Elli Androulaki et al., "Hyperledger Fabric: A Distributed Operating System for Permissioned Blockchains", Proceedings of the Thirteenth Eurosys Conference on Eurosys '18, Apr. 23-26, 2018, Porto, Portugal, discloses a fabric for the operation of restricted-access blockchain database systems. The fabric operates using an Execute-Order-Validate architecture, in which the inspection of transactions, the ordering of transactions into blocks and the validating of the blocks are separate from one another. Only the ordering of the transactions into blocks is timed.

SUMMARY

An aspect relates to improving a distributed database system.

According to a first aspect, a block formation device for a distributed database system comprising a number of node devices is proposed. The block formation device has: a first unit for selecting a number of transactions to be confirmed from a number of unconfirmed transactions provided in the distributed database system; a second unit for forming an unconfirmed block from the selected number of unconfirmed transactions, wherein a respective selected unconfirmed transaction is inspected in terms of validity and discarded in the event of a failed inspection, and otherwise is incorporated into the unconfirmed block, and for providing the unconfirmed block in the distributed database system; and a third unit for receiving a timing cycle from a time source and for determining time slices of a predefined length on the basis of the timing cycle. The first unit and the second unit are configured so as to perform the selection, the formation and the provision exactly once within a respective time slice.

The distributed database system can implement a manipulation-proof transaction ledger (ledger) represented by a chain of confirmed blocks that is stored in each of the node devices. The chain may be formed by concatenation checksums. In particular, the distributed database system may be a blockchain network or a blockchain.

The proposed block formation device may be a mining device. The block formation device may in particular be a component of a node device of the distributed database system.

The proposed block formation device can advantageously form the respective unconfirmed block from the respective unconfirmed transactions provided in the distributed database system in a predefined timing cycle. This can allow timed block formation or mining and hence timed confirmation of unconfirmed transactions. The proposed block formation device can therefore lend the distributed database system suitability for use for controlling an industrial automation installation having real-time demands.

"A number" should be understood to mean a number of one or more.

The devices of the distributed database system, including the number of node devices and in particular the proposed block formation device, may be capable of communication with or networked to one another.

"Providing in the distributed database system" an unconfirmed transaction or an unconfirmed block can be understood to mean that the unconfirmed transaction or the unconfirmed block is transmitted to at least one of the devices of the distributed database system. The unconfirmed transaction to be provided or the provided unconfirmed block can be transmitted to the other devices of the distributed database system directly, indirectly or in peer-to-peer fashion.

The distributed database system may be configured such that the time needed for providing or transmitting an unconfirmed block or an unconfirmed transaction to a majority of or all devices of the distributed database system is shorter than the length of a respective one of the time slices.

The first unit may be configured to select the number of transactions to be confirmed from the provided number of unconfirmed transactions in the order in which the individual unconfirmed transactions are provided. Alternatively, it is also conceivable for the selection to involve a prioritization taking place on the basis of properties of the respective unconfirmed transactions.

The second unit may be configured so as to form the unconfirmed block from the selected number of unconfirmed transactions in accordance with demands of a consensus rule of the distributed database system.

In particular, the second unit may be configured so as to inspect the respective selected unconfirmed transaction in terms of validity in accordance with the consensus rule, to discard the unconfirmed transaction in the event of a failed inspection and otherwise to incorporate the unconfirmed transaction into the unconfirmed block. The inspection can involve a smart contract that is contained in the unconfirmed transaction and/or a smart contract that is stored in a transaction ledger of the distributed database system and referenced by the transaction being executed. In this manner, program code containing control instructions that is stored in the smart contracts can be executed.

In particular, the second unit may be configured so as to protect the unconfirmed block and/or a respective one of the unconfirmed transactions incorporated into the block against manipulations by a checksum, such as for example a hash value or a root checksum of a hash tree, such as a Merkle tree or a Patricia tree.

In particular, the second unit may be configured so as to link the unconfirmed block to the transaction ledger of the distributed database system. To this end, the second unit can incorporate for example a concatenation checksum, such as a checksum of a directly or indirectly preceding block in the chain of confirmed blocks, into the unconfirmed block. Such a concatenation can afford further protection against manipulation.

In this instance, the second unit may be granted access to a local copy of a representation of the transaction ledger of the distributed database system. The local copy may be stored in a node device of the distributed database system— for example a node device of which the block formation device is part or a node device with which the block formation device can communicate.

In particular, the second unit can incorporate a proof value into the unconfirmed block that is to be formed. The proof value can be regarded as proof of a legitimate interest by the block formation unit in the smooth operation of the distributed database system.

For example a proof of stake, a digital signature that identifies a particular authorization or position of trust of the block formation device (known as "permissioned transaction ledger"), or an adapted "proof of work" that can definitely be furnished within a respective time slice, such as for example a "relative" solution to a cryptographic puzzle or "best-effort proof of work", is conceivable.

In particular, the second unit can incorporate a Coinbase transaction into the unconfirmed block to be formed, which grants the block formation device, or a node device associated with the block formation device a remuneration for forming the block.

As a result of the consensus rule of the distributed database firstly prescribing the presence of a proof value in a block to be confirmed and secondly permitting the presence of a Coinbase transaction, firstly the formation and hence manipulation of blocks is hampered and secondly an incentive to form rule-compliant blocks is provided. This advantageously allows a distributed database system to be implemented with an excellent position of trust without a central clearing house.

In reaction to the provision of the thus formed unconfirmed block by the second unit, the node devices of the distributed database system can inspect the provided unconfirmed block for example in accordance with the consensus rule of the distributed database system and transfer the inspected unconfirmed block as latest confirmed block to the transaction ledger of the distributed database system. This allows the unconfirmed transactions that the unconfirmed block contains to be confirmed. Since the unconfirmed block is provided in timed fashion by the proposed block formation device, this allows the unconfirmed transactions to be advantageously confirmed and added to the distributed database system in timed fashion by the distributed database system that comprises the proposed block formation device.

The time source can be a local time source of the block formation device and/or of a node device with which the block formation device is associated, such as for example a chip scale atomic clock, a distributed time source of the distributed database system, such as for example a timing synchronization protocol of the distributed database system such as NTP (Network Time Protocol) or PTP (Precision Time Protocol), or a time source that is external to and remote from the block formation device and the distributed database system, such as for example a timer of a satellite navigation system (GNSS, such as for example GPS, Galileo, Beidou, Glonass), a DCF77 time transmitter or a master node that predefines an industrial timing cycle (such as for example IEEE Time Sensitive Networking, isochronous Profinet or a time frame of a program execution of a programmable logic controller). A timing cycle received from the time source can be an absolute or relative timing cycle. A timing cycle can be understood to mean a sequence of absolute or relative time statements.

The timing cycle can be received repeatedly or cyclically.

A number or each of the devices of the distributed database system can be provided with the same timing cycle or with a respective timing cycle that is synchronous with the timing cycle of the block formation device. The proposed block formation device can therefore be operated in sync with other devices of the distributed database system in accordance with a timing cycle of the distributed database system.

The timing cycle may be a constant timing cycle. That is to say that the respective time slices may be of equal length.

The predefined length of a time slice may be predefined by the timing cycle. By way of example, a time slice may correspond to the period of time between two clock signals, or transmitted time statements, of the timing cycle. The predefined length may also be an integer multiple of the period of time between two clock signals or transmitted time statements.

The third unit may be configured to time the operation of the first unit and the second unit on the basis of the determined time slices. By way of example, it can start the operation of the first unit at the beginning of a respective time slice, start the operation of the second unit after the conclusion of the selection by the first unit, and, at a predetermined time before the end of the time slice of the second unit, transmit a signal prompting the latter to conclude the formation of the unconfirmed block and to provide the unconfirmed block formed in the best possible manner up until then in the distributed database system.

In this way, the first unit and the second unit may be configured so as to perform the selection, formation and provision exactly once within the respective time slice.

Such timing can advantageously allow the use of the distributed database system for storing measured and control values and for executing program code containing control instructions, which is implemented as smart contracts, for controlling an industrial automation installation having real-time demands.

It should be noted that the term "perform exactly once" can also be understood to mean that the selection, formation and provision is either not performed or performed exactly once during the respective time slice. Expressed another way, the selection, formation and provision can be concluded during the respective time slice provided that it is begun. There is also the possibility of it not being begun, for example if the block formation device is not activated for a given time slice.

According to one embodiment, the first unit is configured so as, during the respective time slice, to select all of the unconfirmed transactions provided in the distributed database system that satisfy a predefined condition as transactions to be confirmed.

The proposed block formation device can therefore advantageously ensure that all provided unconfirmed transactions in a respective time slice that satisfy the predetermined condition are confirmed by the node devices of the distributed database system.

The predetermined condition can be that all provided unconfirmed transactions are to be incorporated.

The predetermined condition can be that at least those provided unconfirmed transactions that are identified as time-critical are to be incorporated.

The predetermined condition can be that at least those provided unconfirmed transactions that are transactions with measured values, control values and/or smart contracts containing control commands for an industrial automation system are to be incorporated.

The predetermined condition can be that at least those provided unconfirmed transactions that grant a predefined minimum remuneration to the block formation device for their confirmation are to be confirmed.

It is therefore advantageously possible to ensure that all provided, all time-critical and all unconfirmed transactions with a high level of remuneration in a respective time slice are incorporated into the block formed.

According to one embodiment, the proposed block formation device has a fourth unit for receiving an activation signal. The first unit and the second unit are configured so as to perform the selection, the formation and the provision exactly once within the respective time slice only when the fourth unit receives the activation signal in the respective time slice.

The activation signal can be transmitted by a scheduling device of the distributed database system.

Accordingly, it is possible to use more than one of the proposed block formation devices in a distributed database system. Even if the formation of blocks in the proposed block formation devices takes place in a predefined timing cycle, such an unresolvable competition situation can advantageously be avoided by virtue of the scheduling device respectively activating only one of the block formation devices with the activation signal in a respective time slice. In this instance, the use of multiple block formation devices in alternation may be advantageous in respect of a balance of trust for a majority consensus in the distributed database system. As such, for example a remuneration awarded for successful formation of a block can be granted to different block formation devices in alternation and hence a balance of crypto token credits can be maintained in the distributed database system. This can be advantageous if the distribution of crypto tokens between the node devices is important for the manipulation security of the network, for example when blocks are formed using a proof of stake as proof value.

According to another embodiment, the second unit is configured so as to incorporate a cryptographic proof of work that it is best able to determine within the respective time slice into the block that is formed.

Expressed another way, a modified proof of work is proposed on a best-effort basis. For example, a cryptographic puzzle can be solved not completely but rather only in the best possible manner. By way of example, the second unit can incorporate a random value or nonce into the block that is formed and can determine the nonce such that a checksum of the whole formed block, including the nonce, is as extremal as possible, such as for example as small as possible. If a cryptographic checksum such as a hash value is involved, such determination may be possible only by trial and error. The trial and error can be begun as soon as the block to be formed, with the exception of the nonce to be determined, is formed, and the trial and error can be ended at a predefined time within the respective time slice. In this way, a best possible proof of work within the available time can definitely be provided within the respective time slice.

Accordingly, it is advantageously possible to use more than one of the proposed block formation devices in a distributed database system at the same time. Even if blocks are formed in a predefined timing cycle in the proposed block formation devices, a resultant competition situation can advantageously be resolved by virtue of for example the consensus rule of the distributed database system providing for the node devices of the distributed database system to confirm the block from a number of unconfirmed blocks that contains the best proof of work.

The advantages of mining (forming blocks by proof of work) can therefore be attained even if the blocks are formed in timed fashion according to the proposed block formation devices.

According to another embodiment, the second unit is configured so as to incorporate a timestamp that identifies the respective time slice into the block that is formed.

Accordingly, the consensus rule of the distributed database system can provide for only such unconfirmed blocks as contain a timestamp appropriate to a time slice that is current during confirmation to be confirmed. In this manner, late blocks or premature (possibly manipulated) blocks can advantageously be discarded.

According to a second aspect, a node device for a distributed database system comprising a number of node devices is proposed. The node device has: a fifth unit for storing a chain of confirmed blocks that represent at least one section of a transaction ledger of the distributed database system; a sixth unit for confirming exactly one of a number of unconfirmed blocks provided in the respective time slice in the distributed database system, such that the confirmed block is appended to the chain of confirmed blocks, wherein the confirmation of the exactly one of the number of unconfirmed blocks comprises inspecting one, several or all of the unconfirmed blocks, selecting one of the successfully inspected unconfirmed blocks and appending the selected block, as the confirmed block, to the chain of confirmed blocks; and a third unit for receiving a timing cycle from a time source and determining time slices of predefined length on the basis of the timing cycle. The sixth unit is configured so as to perform a confirmation exactly once within a respective time slice.

The features, definitions and advantages described in describing the proposed block formation device apply accordingly, where appropriate, to the proposed node device.

It can be stated that the proposed node device forms a complementary counterpart to the proposed block formation device.

The proposed node device can advantageously confirm unconfirmed blocks in a predefined timing cycle. By way of example, the proposed node device can confirm the unconfirmed blocks formed in timed fashion by the proposed block formation device using the same timing cycle. This can allow timed confirmation of unconfirmed transactions. The proposed node device can therefore lend the distributed database system comprising the proposed node device suitability for use for controlling an industrial automation installation having real-time demands.

The chain of confirmed blocks that is stored in the fifth unit can be regarded as a local copy of a version of the transaction ledger for which there is, or in time emerges, a consensus between the number of node devices. The consensus can be reached in this instance by virtue of the sixth unit proceeding according to a stipulated consensus rule of the distributed database system when selecting and confirming the exactly one block to be confirmed. Similarly, a block formation device, such as the proposed block formation device, of the distributed database system can proceed according to the same stipulated consensus rule when forming unconfirmed blocks. The consensus rule may be configured such that rule-compliant behavior by a node device is rewarded and nonrule-compliant behavior is not worthwhile, or the node device behaving in non-rule-compliant fashion is automatically denied further participation in consensus-building over the course of time. This can ensure that a consensus is formed such that a majority and all of the node devices of the distributed database system store identical representations of the transaction ledger, and unauthorized manipulations are hampered or prevented.

The sixth unit may be configured so as to inspect a number of the unconfirmed blocks provided in the distributed database system during the respective time slice in accordance with the consensus rule, to discard unconfirmed blocks that do not follow the consensus rule, and to select one block to be confirmed among the remaining unconfirmed blocks in accordance with the consensus rule and to append the selected block to the chain of confirmed blocks and thereby to confirm the block.

"Confirming one of a number of unconfirmed blocks" can therefore be understood to mean inspecting one, several or all of the unconfirmed blocks, selecting one of the successfully inspected unconfirmed blocks and appending the selected block to the chain of confirmed blocks.

"Appending" can be understood to mean both appending to a last confirmed block in the chain of confirmed blocks and creating a copy or fork of the chain of confirmed blocks by appending at a different position, i.e. at an earlier block than the last of the confirmed blocks in the chain of confirmed blocks. In particular, the block to be appended can be appended in accordance with the consensus rule to those blocks from the chain of confirmed blocks whose checksum corresponds to a concatenation checksum that the block to be appended contains.

The consensus rule can predefine which of the copies or forks of the chain of confirmed blocks is considered to be a valid representation of the transaction ledger of the distributed database in this instance. By way of example, the longest of the chains can be considered to be the valid representation.

An unconfirmed transaction provided in the distributed database system can be incorporated by the proposed block formation device into an unconfirmed block that is provided in the distributed database system. The unconfirmed block provided in the distributed database system can be inspected by a respective one of the node devices, as described above, and confirmed by appending it to the transaction ledger (the respective local copy of the transaction ledger) of the distributed database. This allows the transactions that the respective block contains to be confirmed. According to the proposed solution, both the formation of the unconfirmed block and the confirmation of the unconfirmed block and hence the confirmation of the unconfirmed transaction can take place in sync according to a predefined cyclic, timing cycle.

In particular, the sixth unit may be configured to wait in the respective time slice until the formation and provision of blocks by one or more block formation devices of the distributed database system has concluded, and then to select and confirm one of the unconfirmed blocks formed and provided.

The proposed timing can involve a respective time slice being subdivided into a time period for providing unconfirmed transactions, a period for forming unconfirmed blocks, a period for providing the unconfirmed blocks and a period for confirming the provided unconfirmed blocks. Alternatively, it is possible for blocks to be formed and provided in a respective time slice and for blocks to be selected and confirmed in a subsequent time slice alternately.

According to another embodiment, the sixth unit is configured so as to select the exactly one block for confirmation on the basis of at least one criterion.

If there is provision for multiple block formation devices in the network, it is conceivable for more than one unconfirmed block to be provided during a respective time slice. In such a competition situation, the consensus rule can predefine one or more criteria for which of the unconfirmed blocks provided is to be confirmed.

In one variant, the criterion is "number and type of transactions contained in the block".

By way of example, that instance of the multiple unconfirmed blocks that has the most unconfirmed transactions can be selected. It is therefore advantageously possible to ensure a high transaction throughput for the distributed database system.

By way of example, that instance of the multiple unconfirmed blocks that has the most transactions of a specific type can be selected. It is therefore advantageously possible to prioritize certain transactions, such as for example time-critical transactions.

In one variant, the criterion is "quality of a cryptographic proof of work contained in the block".

By way of example, a block from the multiple unconfirmed blocks that solves a cryptographic puzzle of higher quality can be, for example that block having the lowest nonce value as proof of work. A quality of a cryptographic proof of work may be substantially unpredictable or random. It is therefore advantageously possible to ensure that blocks that stem from different node devices or block formation devices are in different time slices. If the confirmation of a block has provision for a remuneration for the node device that has formed the block, this allows a balance of crypto token credits to be ensured in the distributed database system.

In one variant, the criterion is "quality and/or computational complexity of a respective transaction contained in the block".

The computational complexity of a respective transaction can relate in particular to the processing load that the block formation device that has formed the block has applied in order to inspect the transaction for validity. If a transaction contains or references a smart contract, this processing load may be considerable. As a result, a block formation device that inspects such a transaction may have less remaining processing capacity for determining a proof of work that is as good as possible within the respective time slice. If exclusively the criterion "quality of a proof of work" is applied, there would therefore be little likelihood of the relevant block being selected by the node devices for confirmation. If the criterion "quality of a respective transaction" is additionally also applied, however, this effect can be compensated for and unconfirmed blocks containing complex transactions can advantageously be prevented from being put at a disadvantage during selection for confirmation.

Further examples of a transaction quality are for example a quantity or amount of crypto tokens (the higher the amount, the higher the quality of the transaction), a type of the transaction (the more time-critical the transaction, the higher its quality), a volume of data contained in the transaction, etc.

In one variant, the criterion is "match between a timestamp contained in the block and the respective time slice".

This criterion advantageously allows a correspondence to be produced between a sequence of the confirmed transactions in the transaction ledger of the distributed database system and the sequence of the provision of the unconfirmed transactions. That is to say that it is possible to prevent a delayed block from being incorporated late or a block containing a future timestamp, such as for example a manipulated block, being confirmed prematurely. The reliability and real-time capability of the distributed database system can therefore be improved.

It should be noted that "match" can be understood to mean not only the case in which the timestamp contained in the block denotes the respective time slice but also the case in which the timestamp contained in the block denotes a time slice that directly or indirectly precedes the respective time slice.

In one variant, the criterion is "whether a block formation device that provided the block is a block formation device for which an activation signal transmitted in the distributed database system during the respective time slice is determined".

According to this criterion, it is advantageously possible to prevent block formation devices that have not been explicitly activated (and are therefore possibly acting maliciously) from smuggling blocks into the distributed database system.

According to another embodiment, the sixth unit is configured so as to select the exactly one block for confirmation on the basis of a criterion as to whether the block contains all of the unconfirmed transactions provided in the distributed database system during the respective time slice that satisfy a predefined condition.

The description above in regard to the "predefined condition" for embodiments of the block formation device applies accordingly.

If such a criterion is part of the consensus rule of the distributed database system, any block formation device of the distributed database system has an interest in incorporating all of the unconfirmed transactions provided in the distributed database system in a respective time slice that satisfy the predefined condition into the unconfirmed block formed by the block formation device, since the block would otherwise not be confirmed and the block formation device would accordingly receive no remuneration.

The present criterion can therefore advantageously be used to ensure that, in each time slice, all of the unconfirmed transactions provided in the relevant time slice that satisfy the predefined condition are incorporated into an unconfirmed block by a block formation device of the distributed database system during the same time slice and are confirmed by the node devices of the distributed database system by confirming the unconfirmed block during the same or the subsequent time slice.

The criteria for selecting the block for confirmation according to the above variants and embodiments are arbitrarily combinable.

According to another embodiment, the proposed node device has the proposed block formation device.

Expressed another way, both the timed block formation functionality performed by the proposed block formation device and the timed confirmation functionality performed by the above-described proposed node device may be combined in a proposed node device. It goes without saying that in this instance the third unit of the node device and the third unit of the integrated block formation device may be identical for the node device that comprises the block formation device. In other words, there may be provision for only one third unit.

In an embodiment, it is therefore possible for one, of the node devices of a distributed database system both to form unconfirmed blocks in timed fashion and to confirm unconfirmed blocks provided in timed fashion by other node devices in timed fashion.

According to another embodiment, a distributed database system is proposed that comprises a number of the proposed node devices. The proposed node devices are configured so as to jointly manage the transaction ledger of the distributed database system. At least one of the node devices comprises a proposed block formation device. The node devices are operable in sync in accordance with a timing cycle of the distributed database system.

As a result of the node devices of the proposed distributed database system being operable in sync, it is possible to ensure particularly reliably that unconfirmed transactions can be confirmed within a time slice derived from the timing cycle.

The number of node devices may be operable in sync by virtue of the timing cycles to be received by the respective node device and the timing cycle of the distributed database system being synchronous. Alternatively, a respective node device may be configured so as to receive the same timing cycle of the distributed database system.

In particular the timing cycle(s) to be received by the respective node device and the timing cycle of the distributed database system are therefore in sync.

Synchronous operation of the node devices of the distributed database system can be understood to mean in particular the following:

Timing, or the respective time slices, of a timed block formation functionality (of the first to third units) and a timed confirmation functionality (of the fifth, sixth and third units) of the node devices of the distributed database system is synchronized. This can be understood to mean that the same timing is used, or the respective time slices coincide, or that the timing of the timed block formation functionality and the timing of the timed confirmation functionality, or the respective time slices, are shifted by a fixed time offset. However, it is also possible for the timing of the timed block formation functionality to be effected in a manner timed independently of the timing of the timed confirmation functionality. Other variants of the timing are conceivable. By way of example, the timing cycle of the timed confirmation functionality can be formed by dividing the timing cycle of the timed block formation functionality. By way of example, a respective block can be formed by the timed confirmation functionality in each case after a plurality of, for example two or four, timing cycles of the timed block formation functionality.

Furthermore, it is conceivable for the timing cycle not to be fixed, but rather to be adaptively matched, depending on the number and/or type of the unconfirmed transactions provided.

In particular, more than one of the node devices can comprise a respective block formation device as proposed. The distributed database system can have a scheduling device configured so as to transmit an activation signal to a respective one of the block formation devices in the respective time slice.

In this instance, the scheduling device may be configured so as to decide according to a predefined sequence, at random, or on the basis of properties of a respective node device, such as for example a quantity of crypto tokens held by the respective node device, to which of the node devices (block formation devices) the activation signal is transmitted in the respective time slice.

According to another embodiment, the distributed database system comprises a central time source, wherein the time source for which the third unit of the respective node device receives the timing cycle is the central time source.

The central time source may be a DCF77 time transmitter, a GNSS timer, an NTP/PTP server or a master node that predefines an industrial timing cycle, or the like.

Use of a central time source allows the structure of a respective node device to be simplified since the timing cycle merely needs to be received and no local timer is required for the node devices.

According to another embodiment, an industrial automation system is proposed that comprises the proposed distributed database system and a number of automation components operable according to a timing cycle. The distributed database system is operable for the purpose of regulating and/or controlling the number of automation components. The timing cycle of the distributed database system is synchronous with the timing cycle of the number of automation components or an integer multiple of the timing cycle of the number of automation components.

Examples of automation components are sensors configured so as to measure a physical state in an industrial installation, actuators configured so as to influence a physical state in an industrial installation, control units that implement control logic for determining control values for the actuators on the basis of measured values from the sensors, and the like.

The distributed database system may be operable for controlling the number of automation components for example by virtue of sections of the control logic of the automation system being stored in the form of smart contracts confirmed in the transaction ledger of the distributed database system. Similarly, measured values delivered by the number of automation components and/or control values to be transmitted to the number of automation components can be confirmed in the form of transactions in the transaction ledger of the distributed database system. This advantageously allows transparency, protection against manipulation and traceability of the operation of the automation system to be attained. The timed operation of the proposed database system, which can allow in particular timed confirmation of unconfirmed transactions and hence timed execution of smart contracts, allows these and other advantages of the blockchain-based distributed database system to be attained even when high real-time demands are made on the control logic of the automation system. In particular, the synchronization of the timing cycle of the distributed database system with the timing cycle of the automation system allows individual control steps of the automation system to be performed in a manner traceable by the distributed database system and to be documented in manipulation-proof fashion.

In one variant of the proposed industrial automation system and/or of the proposed distributed database system, it is conceivable for the distributed database system to store multiple transaction ledgers, each transaction ledger being represented by a chain of confirmed blocks, wherein one chain from the number of chains represents a main transaction ledger and the other chains from the number of chains represent respective side transaction ledgers of the distributed database system.

The chains that represent the side transaction ledgers ("side chains") can be operated using time slices that are shorter by an integer factor than the time slices used to operate the chain that represents the main transaction ledger ("main chain").

The main chain and the side chains can be operated according to different consensus rules. As such, a lower cryptographic level of protection may be implemented in a side chain, but the operation of the side chain can be achieved with lower resource involvement. By contrast, a high cryptographic level of protection may be implemented in a main chain.

"Operation of a chain" can be understood in this instance to mean the operation of those node devices that store the respective chain in their fifth unit.

This advantageously allows a load distribution over the chains to be achieved, with transactions of lower significance being confirmed in the side chains and transactions of higher significance being confirmed in the main chain.

A respective side transaction ledger can be linked to the main transaction ledger by selected blocks of the side transaction ledger at regular block intervals using hash values or the like stored in the main transaction ledger. As a result, a high level of protection offered by the main chain can at least to some extent also be extended to the side chains.

The respective unit, for example a respective unit from the first to sixth units, can be implemented in hardware and/or also in software. In the case of a hardware implementation, the respective unit may be in the form of an apparatus or in the form of part of an apparatus, for example in the form of a computer or in the form of a microprocessor or in the form of a control computer of a vehicle. In the case of a software implementation, the respective unit may be in the form of a computer program product (non-transitory computer readable storage medium having instructions, which when executed by a processor, perform actions), in the form of a function, in the form of a routine, in the form of part of a program code or in the form of an executable object.

According to a third aspect, a block formation method for a distributed database system comprising a number of node devices is proposed. The block formation method comprises: selecting a number of transactions to be confirmed from a number of unconfirmed transactions provided in the distributed database system; forming an unconfirmed block from the selected number of unconfirmed transactions, wherein a respective selected unconfirmed transaction is inspected in terms of validity and discarded in the event of a failed inspection, and otherwise is incorporated into the unconfirmed block, and providing the unconfirmed block in the distributed database system; and receiving a timing cycle from a time source and determining time slices of a predefined length on the basis of the timing cycle. The selection, the formation and the provision take place exactly once within a respective time slice.

The embodiments and features described for the proposed block formation device according to the first aspect apply to the proposed block formation method according to the third aspect accordingly.

According to a fourth aspect, a block confirmation method for a distributed database system comprising a number of node devices is proposed. The block confirmation method comprises: storing a chain of confirmed blocks that represent a main ledger of a distributed database; confirming exactly one of a number of unconfirmed blocks provided in the respective time slice in the distributed database system, wherein the confirmed block is appended to the chain of confirmed blocks, wherein the confirmation of the exactly one of the number of unconfirmed blocks comprises inspecting one, several or all of the unconfirmed blocks, selecting one of the successfully inspected unconfirmed blocks and appending the selected block, as the confirmed block, to the chain of confirmed blocks; and receiving a timing cycle from a time source and determining time slices of a predefined length on the basis of the timing cycle. The confirmation takes place exactly once within a respective time slice.

The embodiments and features described for the proposed node device according to the second aspect apply to the proposed block confirmation method according to the fourth aspect accordingly.

Furthermore, a computer program product is proposed that prompts a program-controlled device to perform one of the methods explained above.

A computer program product, such as e.g., a computer program means, can be provided or supplied for example as a storage medium, such as e.g., a memory card, USB stick, CD-ROM, DVD, or else in the form of a downloadable file from a server in a network. This can be effected for example in a wireless communication network by the transfer of an applicable file containing the computer program product or the computer program means.

More specific details and further variants of distributed database systems based on blockchain technology to which the proposed block formation device, the proposed node device and the proposed methods are applicable are explained below.

Unless indicated otherwise in the description below, the terms "perform", "calculate", "computer-aided", "compute", "establish", "generate", "configure", "reconstruct", and the like relate to actions and/or processes and/or processing steps that change and/or generate data and/or convert the data into other data, wherein the data may be represented or be present in particular in the form of physical variables, for example in the form of electrical impulses. The expression "computer" should in particular be interpreted as broadly as possible in order in particular to cover all electronic devices having data processing properties. Computers may thus for example be personal computers, servers, programmable logic controllers (PLCs), hand-held computer systems, pocket PC devices, mobile radio devices and other communication devices able to process data in a computer-aided manner, processors and other electronic data processing devices.

"Computer-aided" in connection with embodiments of the invention can be understood to mean for example an implementation of the method in which in particular a processor executes at least one method step of the method.

A processor in connection with embodiments of the invention can be understood to mean for example a machine or an electronic circuit. A processor may be in particular a main processor (central processing unit, CPU), a microprocessor or a microcontroller, for example an application-specific integrated circuit or a digital signal processor, possibly in combination with a memory unit for storing program commands, etc. A processor may also be for example an IC (integrated circuit), in particular an FPGA (field-programmable gate array) or an ASIC (application-specific integrated circuit), or a DSP (digital signal processor) or a graphics processor GPU (graphic processing unit). A processor can also be understood to mean a virtualized processor, a virtual machine or a soft CPU. It may also be for example a programmable processor that is equipped with configuration steps for executing the method according to embodiments of the invention or is configured by way of configuration steps such that the programmable processor implements the features according to embodiments of the invention of the method, the component, the modules or other aspects and/or partial aspects of embodiments of the invention.

A "memory unit", a "memory module" and the like in connection with embodiments of the invention can be understood to mean for example a volatile memory in the form of main memory (random access memory, RAM) or a permanent memory such as a hard disk or a data carrier.

A "module" in connection with embodiments of the invention can be understood to mean for example a processor and/or a memory unit for storing program commands. By way of example, the processor is specifically configured so as to execute the program commands such that the processor executes functions in order to implement or perform the method according to embodiments of the invention or a step of the method according to embodiments of the invention. A module may also be for example a node of the distributed database system that for example performs the specific functions/features of an applicable module. The respective modules may for example also be in the form of separate or standalone modules. For this purpose, the applicable modules may for example comprise further elements. These elements are for example one or more interfaces (e.g. database interfaces, communication interfaces e.g. network interface, WLAN interface) and/or an evaluation unit (e.g. a processor) and/or a memory unit. Data can for example be interchanged (for example received, transmitted, sent or provided) by the interfaces. Data can for example be compared, checked, processed, assigned or calculated in a computer-aided manner and/or in an automated manner by the evaluation unit. Data can for example be stored, retrieved or provided in a computer-aided manner and/or in an automated manner by the memory unit.

"Comprise", in particular in relation to data and/or information, in connection with embodiments of the invention can be understood to mean for example (computer-aided) storage of applicable information or applicable data in a data structure/data record (that is e.g. in turn stored in a memory unit).

"Assign", in particular in relation to data and/or information, in connection with embodiments of the invention can be understood to mean for example computer-aided assignment of data and/or information. By way of example, a second item of data is assigned to a first item of data in this regard by a memory address or a unique identifier (UID), e.g. by storing the first item of data together with the memory address or the unique identifier of the second item of data together in a data record.

"Provide", in particular in relation to data and/or information, in connection with embodiments of the invention can be understood to mean for example computer-aided provision. Provision is performed for example via an interface (e.g. a database interface, a network interface, an interface to a memory unit). Applicable data and/or information can be transmitted and/or sent and/or retrieved and/or received via this interface for example in the course of the provision.

"Provide" in connection with embodiments of the invention can also be understood to mean for example loading or storing, for example of a transaction containing applicable data. This can for example take place on or from a memory module. "Provide" can also be understood to mean for example transmitting (or sending or transferring) applicable data from one node to another node of the blockchain or of the distributed database system (or the infrastructure thereof).

"Smart contract process" in connection with embodiments of the invention can be understood to mean in particular execution of a program code (e.g. the control commands) in a process by the distributed database system or the infrastructure thereof.

A "checksum", for example a data block checksum, a data checksum, a node checksum, a transaction checksum, a concatenation checksum or the like, in connection with embodiments of the invention can be understood to mean for example a cryptographic checksum or cryptographic hash or hash value that is formed or calculated in particular by a cryptographic hash function using a data record and/or data and/or one or more of the transactions and/or a subrange of a data block (e.g. the block header of a block of a blockchain or data block header of a data block of the distributed database system or just some of the transactions of a data block). A checksum may be in particular a checksum or checksums or hash value or hash values of a hash tree (e.g. Merkle tree, Patricia tree). It may furthermore also in particular be understood to mean a digital signature or a cryptographic message authentication code. By the checksums, it is possible for example to achieve cryptographic protection/protection against manipulation for the transactions and the data (records) stored therein at different levels of the database system. If for example a high level of security is required, the checksums are for example generated and checked at transaction level. If a less high level of security is required, the checksums are for example generated and checked at block level (e.g. over the whole data block or only over part of the data block and/or some of the transactions).

A "data block checksum" in connection with embodiments of the invention can be understood to mean a checksum that is calculated for example using some or all of the transactions of a data block. A node may then for example check/establish the integrity/authenticity of the applicable part of a data block by the data block checksum. In addition or as an alternative, the data block checksum may in particular also have been formed using transactions of a preceding data block/predecessor data block of the data block. The data block checksum may also in particular be implemented by a hash tree, for example a Merkle tree or a Patricia tree, wherein the data block checksum is in particular the root checksum of the Merkle tree or of a Patricia tree or of a binary hash tree. Transactions are in particular secured by further checksums from the Merkle tree or Patricia tree (e.g. using the transaction checksums), wherein the further checksums are in particular leaves in the Merkle tree or Patricia tree. The data block checksum may thus for example secure the transactions by virtue of the root checksum being formed from the further checksums. The data block checksum may in particular be calculated for transactions of a particular data block of the data blocks. Such a data block checksum may in particular be incorporated into a data block succeeding the particular data block, in order to concatenate this succeeding data block for example to its preceding data blocks and in particular thereby allow the integrity of the distributed database system to be checked. As a result, the data block checksum may for example take over the function of the concatenation checksum or be incorporated into the concatenation checksum. The header of a data block (e.g. of a new data block or of the data block for which the data block checksum was formed) may for example comprise the data block checksum.

"Transaction checksum" in connection with embodiments of the invention can be understood to mean a checksum that is formed in particular via a transaction of a data block. Calculation of a data block checksum for an applicable data block can additionally be sped up, for example, since for this purpose for example previously calculated transaction checksums can immediately be used as e.g. leaves of a Merkle tree.

A "concatenation checksum" in connection with embodiments of the invention can be understood to mean a checksum that indicates or references in particular a respective data block of the distributed database system or the preceding data block of the distributed database system (in particular frequently referred to as "previous block hash" in the specialist literature). For this purpose, an applicable concatenation checksum is formed in particular for the applicable preceding data block. A transaction checksum or the data block checksum of a data block (that is to say an existing data block of the distributed database system) may for example be used as concatenation checksum in order to concatenate a new data block to an (existing) data block of the distributed database system. It is, however, also possible for example for a checksum to be formed using a header of the preceding data block or using the entire preceding data block and to be used as concatenation checksum. This can for example also be calculated for multiple or all preceding data blocks. It is for example also possible for the concatenation checksum to be formed using the header of a data block and the data block checksum. A respective data block of the distributed database system in each case comprises a concatenation checksum that was calculated for or relates to a preceding data block, in particular even more desirable the directly preceding data block, of the respective data block, however. It is also possible for example for an applicable concatenation checksum to be formed even using just part of the applicable data block (e.g. preceding data block). This allows for example a data block to be created that comprises an integrity-protected part and an unprotected part. It would thus for example be possible to create a data block whose integrity-protected part is invariable and whose unprotected part can also be changed later on. Integrity-protected should be understood to mean in particular that it is possible to identify a change of integrity-protected data by a checksum.

The data that are stored for example in a transaction of a data block may in particular be provided in various ways. Instead of the data, e.g. user data such as measurement data, measured values, control values, or data/ownership structures of assets, a transaction of a data block may comprise only the checksum for these data, for example. The applicable checksum can be formed in various ways. This may be e.g. an applicable data block checksum of a data block (containing the applicable data) of another database or of the distributed database system, a transaction checksum of a data block containing the applicable data (of the distributed database system or of another database) or a data checksum that was formed using the data.

In addition, the applicable transaction can comprise a reference to or an indication of a storage location (e.g. an address of a file server and indications as to where the applicable data may be found on the file server; or an address of another distributed database that comprises the data). The applicable data could then for example also be provided in another transaction of a further data block of the distributed database system (e.g. if the applicable data and the associated checksums are contained in different data blocks). It is, however, also conceivable for example for these data to be provided via another communication channel (e.g. via another database and/or a cryptographically secured communication channel).

In addition to the checksum, an additional data record (e.g. a reference to or an indication of a storage location) may also be stored in the applicable transaction, for example, this in particular indicating a storage location from which the data can be retrieved. This is in particular advantageous in order to keep an amount of data in the blockchain or in the distributed database system as low as possible.

"Security-protected" in connection with embodiments of the invention can be understood to mean for example protection that is achieved in particular by a cryptographic method. By way of example, this can be achieved by using the distributed database system to provide or transmit or send applicable data/transactions. This is achieved by combining the various (cryptographic) checksums, since these interact in particular in a synergistic manner in order for example to improve the security or the cryptographic security for the data in the transactions. In other words, "security-protected" in connection with embodiments of the invention can also in particular be understood to mean "cryptographically protected" and/or "protected against manipulation". "Protected against manipulation" can also be referred to as "integrity-protected".

"Concatenating (the) data blocks of a distributed database system" in connection with embodiments of the invention can be understood to mean for example that data blocks in each case contain information (e.g. concatenation checksum) that indicates or references another data block or multiple other data blocks of the distributed database system.

"Insertion into the distributed database system" and the like in connection with embodiments of the invention can be understood to mean for example that in particular a transaction or the transactions or a data block containing its transactions is transmitted to one or more nodes of a distributed database system. If these transactions are for example validated successfully (e.g. by the node(s)), these transactions are in particular concatenated in the form of a new data block to at least one existing data block of the distributed database system. For this purpose, the applicable transactions are stored in a new data block, for example. This validation and/or concatenation can in particular be performed by a trusted node (e.g. a mining node, a blockchain oracle or a blockchain platform). A blockchain platform can in particular be understood to mean a blockchain as a service, as proposed in particular by Microsoft or IBM. A trusted node and/or a node can in particular in each case store a node checksum (e.g. a digital signature) in a data block (e.g. in the data block validated and generated by them, which is then concatenated), in order in particular to make it possible to identify the originator of the data block and/or to make it possible to identify the node. This node checksum indicates which node has for example concatenated the applicable data block to at least one other data block of the distributed database system.

"Transaction" or "transactions" in connection with embodiments of the invention can be understood to mean for example a smart contract, a data structure or a transaction data record that in particular in each case comprises one of the transactions or multiple transactions. "Transaction" or "transactions" in connection with embodiments of the invention can also be understood to mean for example the data of a transaction of a data block of a blockchain. A transaction may in particular comprise a program code that for example executes a smart contract. By way of example, in connection with embodiments of the invention, a transaction can also be understood to mean a control transaction and/or confirmation transaction. Alternatively, a transaction may be for example a data structure that stores data (e.g. control commands and/or contract data and/or other data such as video data, user data, measurement data, etc.).

"Storing transactions in data blocks", "storing transactions" and the like can in particular be understood to mean directly storing or indirectly storing. Directly storing can be understood to mean for example that the applicable data block (of the distributed database system) or the applicable transaction (of the distributed database system) contains the respective data. Indirectly storing can be understood to mean for example that the applicable data block or the applicable transaction comprises a checksum and optionally an additional data record (e.g. a reference to or an indication of a storage location) for applicable data and the applicable data are therefore not stored directly in the data block (or the transaction) (that is to say rather only a checksum for these data). When transactions are stored in data blocks, these checksums can in particular be validated, for example, as is explained for example under "insertion into the distributed database system".

A "program code" (e.g. a smart contract) in connection with embodiments of the invention can be understood to mean for example a program command or multiple program commands that are stored in particular in one or more transactions. The program code is in particular executable and is executed by the distributed database system, for example. This can be performed for example by an execution environment (e.g. a virtual machine), wherein the execution environment or the program code are Turing complete. The program code is executed by the infrastructure of the distributed database system. A virtual machine is created by the infrastructure of the distributed database system, for example.

A "smart contract" in connection with embodiments of the invention can be understood to mean for example an executable program code (see in particular "program code" definition). The smart contract is stored in a transaction of a distributed database system (e.g. a blockchain), for example in a data block of the distributed database system. By way of example, the smart contract can be executed in the same way as explained in the definition of "program code", in particular in connection with embodiments of the invention.

"Proof of work" in connection with embodiments of the invention can be understood to mean for example solving a computationally intensive task that needs to be solved in particular depending on the data block content/content of a particular transaction. A computationally intensive task of this kind is also referred to as a cryptographic puzzle, for example.

A "distributed database system", which can also be referred to for example as a distributed database, in connection with embodiments of the invention can be understood to mean for example a decentralized distributed database, a blockchain, a distributed ledger, a distributed storage system, a distributed-ledger-technology (DLT)-based system (DLTS), a revision-proof database system, a cloud, a cloud service, a blockchain in a cloud or a peer-to-peer database. Various implementations of a blockchain or of a DLTS can also be used, for example, such as e.g. a blockchain or a DLTS that are implemented by a directed acyclic graph (DAG), a cryptographic puzzle, a hash graph or a combination of the implementation variants. Various consensus rules or consensus methods (consensus algorithms) can also be implemented, for example. This may be for example a consensus method by a cryptographic puzzle, gossip about gossip, virtual voting or a combination of the methods (e.g., gossip about gossip in combination with virtual voting). If for example a blockchain is used, then this can be implemented in particular by a Bitcoin-based implementation or an Ethereum-based implementation. A "distributed database system" can also be understood to mean for example a distributed database system at least some of whose nodes and/or devices and/or infrastructure are formed by a cloud. By way of example, the applicable components are formed as nodes/devices in the cloud (e.g. as virtual nodes in a virtual machine). This can be achieved for example by VM-ware, Amazon Web Services or Microsoft Azure. On account of the high flexibility of the explained implementation variants, partial aspects of the implementation variants can in particular also be combined with one another, e.g. by using a hash graph as blockchain, wherein the blockchain itself may e.g. also be blockless.

If for example a directed acyclic graph (DAG) is used (e.g. IOTA or Tangle), transactions or blocks or nodes of the graph are in particular connected to one another via directed edges. This means in particular that (all of the) edges (always) have the same direction, similarly to in the case of e.g. time. In other words, it is in particular impossible to run or jump backwards through the transactions or the blocks or the nodes of the graph (that is to say counter to the common same direction). Acyclic means or an acyclic device in particular that there are no loops when running through the graph.

The distributed database system may be for example a public distributed database system (e.g. a public blockchain) or a closed (or private) distributed database system (e.g. a private blockchain).

If it is for example a public distributed database system, this means that new nodes and/or devices are able to join or be accepted by the distributed database system without proof of authorization or without authentication or without logon information or without credentials. In such a case, the operators of the nodes and/or devices can in particular remain anonymous.

If the distributed database system is for example a closed distributed database system, new nodes and/or devices require for example valid proof of authorization and/or valid authentication information and/or valid credentials and/or valid logon information in order to be able to join the distributed database system or in order to be accepted thereby.

A distributed database system may for example also be a distributed data interchange communication system. This may be for example a network or a peer-2-peer network.

"Data block", which can also be referred to as "block" in particular depending on context and implementation, in connection with embodiments of the invention can be understood to mean for example a data block of a distributed database system (e.g. a blockchain or a peer-to-peer database) that is formed in particular as a data structure and so that in each case comprises one of the transactions or multiple instances of the transactions. In one implementation, the database (or the database system) may for example be a DLT-based system (DLTS) or a blockchain and a data block may be a block of the blockchain or of the DLTS. A data block can comprise for example information about the size (data size in bytes) of the data block, a data block header (block header), a transaction counter and one or more transactions. The data block header can comprise for example a version, a concatenation checksum, a data block checksum, a timestamp, a proof of work and a nonce (one-off value, random value or counter that is used for the proof of work). A data block may for example also just be a particular memory area or address area of the overall data that are stored in the distributed database system. It is thereby possible for example to create blockless distributed database systems, such as e.g. the IoT chain (ITC), IOTA, and Byteball. In this case, the functionalities of the blocks of a blockchain and of the transactions are in particular combined with one another such that e.g. the transactions themselves secure the sequence or chain of transactions (of the distributed database system) (that is to say are stored in particular in a security-protected manner). For this purpose, the transactions themselves can for example be concatenated to a concatenation checksum, by virtue of a separate checksum or the transaction checksum of one or more transactions serving as a concatenation checksum that is jointly stored in the applicable new transaction when a new transaction is stored in the distributed database system. In such an embodiment, a data block can for example also comprise one or more transactions, wherein for example a data block corresponds to a transaction in the simplest case.

"Nonce" in connection with embodiments of the invention can be understood to mean for example a cryptographic nonce (abbreviation for: "used only once" or "number used once"). A nonce in particular denotes individual combinations of numbers or a combination of letters that is used a single time in the respective context (e.g. transaction, data transmission).

"Preceding data blocks of a (particular) data block of the distributed database system" in connection with embodiments of the invention can be understood to mean for example the data block of the distributed database system that in particular directly precedes a (particular) data block. Alternatively, "preceding data blocks of a (particular) data block of the distributed database system" can in particular also be understood to mean all of the data blocks of the distributed database system that precede the particular data block. As a result, for example the concatenation checksum or the transaction checksum can in particular be formed using only the data block (or the transactions thereof) directly preceding the particular data block or using all of the data blocks (or the transactions thereof) preceding the first data block.

A "blockchain node", "node", "node of a distributed database system", "node device" and the like in connection with embodiments of the invention can be understood to mean for example devices (e.g., field devices, mobile telephones), computers, smartphones, clients or subscribers that perform operations (using) the distributed database system (e.g. a blockchain). Such nodes can for example execute transactions of a distributed database system or the data blocks of the transactions or insert or concatenate new data blocks containing new transactions into the distributed database system by new data blocks. This validation and/or concatenation can in particular be performed by a trusted node (e.g. a mining node) or exclusively by trusted nodes. A trusted node is for example a node that has additional security measures (e.g. firewalls, access restrictions to the node or the like) in order to prevent manipulation of the node. As an alternative or in addition, for example a trusted node can store a node checksum (e.g. a digital signature or a certificate) in the new data block when a new data block is concatenated to the distributed database system. It is therefore in particular possible to provide proof that indicates that the applicable data block was inserted by a particular node or that indicates its origin. The devices (e.g. the applicable device) are for example devices of a technical system and/or industrial installation and/or of an automation network and/or of a production installation that are in particular also a node of the distributed database system. The devices may for example be field devices or may be devices in the Internet of Things that are in particular also a node of the distributed database system. Nodes can for example also comprise at least one processor in order e.g. to execute their computer-implemented functionality.

A "blockchain oracle" and the like in connection with embodiments of the invention can be understood to mean for example nodes, devices or computers that e.g. have a security module that is implemented for example by software protection mechanisms (e.g. cryptographic methods), mechanical protection devices (e.g. a closable housing) or electrical protection devices (e.g. tamper protection or a protection system that erases the data of the security module in the event of unauthorized use/operation of the blockchain oracle). The security module can comprise for example cryptographic keys necessary to calculate the checksums (e.g. transaction checksums or node checksums).

A "computer" or a "device" in connection with embodiments of the invention can be understood to mean for example a computer (system), a client, a smartphone, a device or a server that are in each case arranged outside the blockchain or are not a subscriber of the distributed database system (e.g. the blockchain) (that is to say do not perform any operations using the distributed database system, or only query it, but without performing transactions, inserting data blocks or calculating proof of work). Alternatively, a computer can in particular also be understood to mean a node of the distributed database system. In other words, a device can in particular be understood to mean a node of the distributed database system or else a device outside the blockchain or the distributed database system. A device outside the distributed database system can for example access the data (e.g. transactions or control transactions) of the distributed database system and/or be actuated by nodes (e.g. by smart contracts and/or blockchain oracles). If for example an actuator or controller of a device (e.g. a device in the form of a node or a device outside the distributed database system) is formed by a node, this can be achieved e.g. by a smart contract that is stored in particular in a transaction of the distributed database system.

Further possible implementations of embodiments of the invention also encompass combinations, not mentioned explicitly, of features or embodiments as described above or below with respect to the exemplary embodiments. A person skilled in the art will also add individual aspects as improvements or supplementations to the respective basic form of embodiments of the invention.

BRIEF DESCRIPTION

Some of the embodiments will be described in detail, with references to the following Figures, wherein like designations denote like members, wherein:

FIG. 1 schematically illustrates a block formation device according to a first exemplary embodiment;

FIG. 2 shows a flowchart for a block formation method according to the first exemplary embodiment;

FIG. 3 schematically illustrates a node device according to a second exemplary embodiment;

FIG. 4 shows a flowchart for a block confirmation method according to the second exemplary embodiment;

FIG. 5 schematically illustrates a node device according to a development of the first and second exemplary embodiments;

FIG. 6 illustrates a distributed database system according to a third exemplary embodiment;

Figure 8:
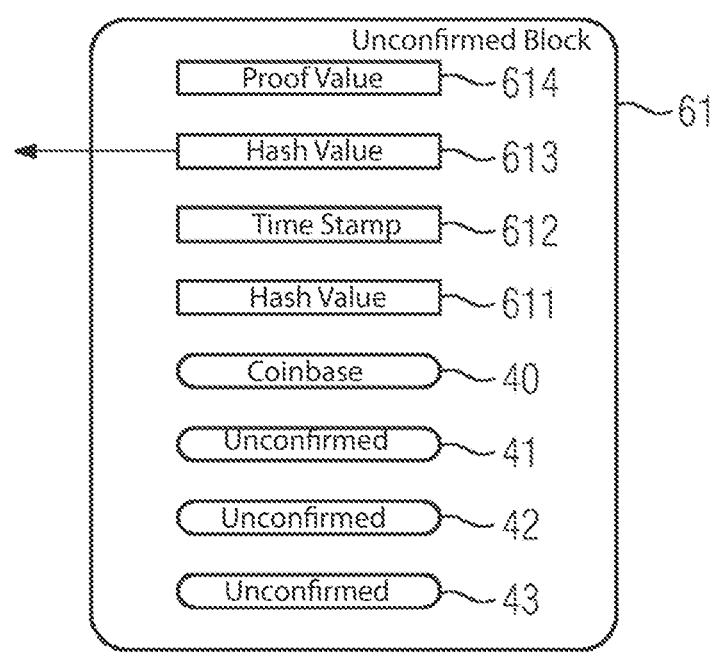

FIG. 8 schematically illustrates an unconfirmed block according to exemplary embodiments;

FIG. 9 illustrates a transaction ledger of the distributed database system according to a variant of the third exemplary embodiment; and FIG. 10 illustrates a distributed database system according to a fourth exemplary embodiment.

DETAILED DESCRIPTION

Figure 1:
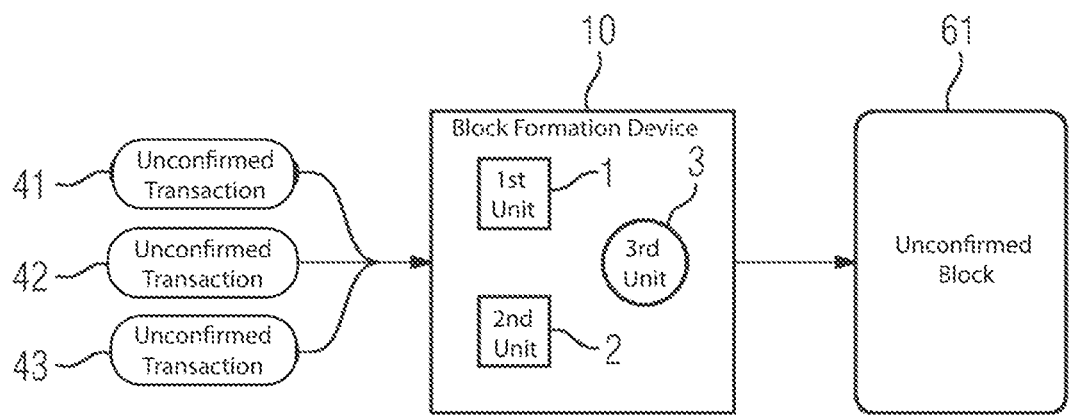
Figure 2:
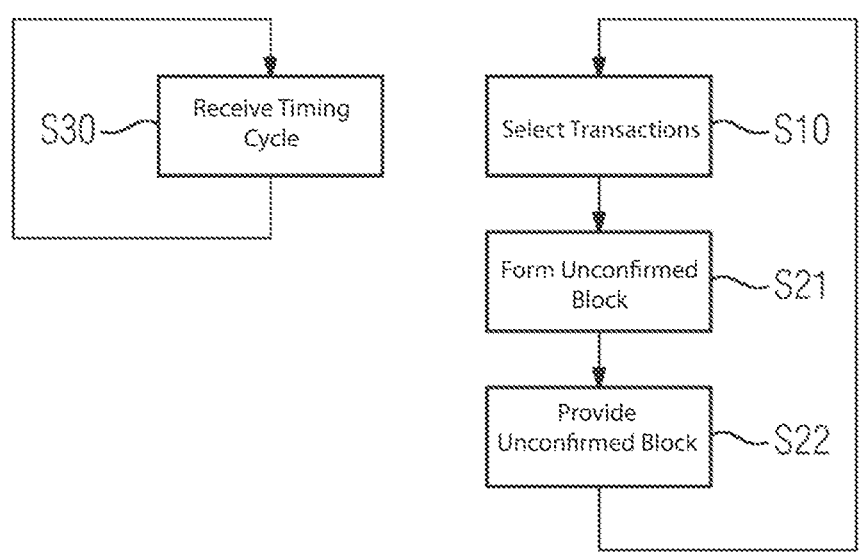

FIG. 1 schematically illustrates a block formation device 10 and FIG. 2 shows a flowchart for a block formation method according to the first exemplary embodiment. The block formation device 10 and the block formation method according to the first exemplary embodiment are now described on the basis of FIG. 1 and FIG. 2.

The block formation device 10 has a first unit 1, a second unit 2 and a third unit 3. A number of unconfirmed transactions 41, 42, 43 are provided in a distributed database system (not shown) to which the block formation device 10 belongs. The number of unconfirmed transactions 41, 42, 43 are therefore also provided to the block formation device 10.

The block formation device 10 is configured so as to form a respective unconfirmed block 61 from selected instances of the unconfirmed transactions 41, 42, 43 in timed fashion, the unconfirmed block being able to be confirmed by node devices (not shown) of the distributed database system (not shown) by incorporating it into a transaction ledger of the distributed database system in accordance with a consensus rule of the distributed database system.

Specifically, the third unit 3 is a time receiver. In step S30, the third unit 3 repeatedly or cyclically receives a timing cycle from a time source (not shown). The time source may be an internal time source of the block formation device 1 or an external time source. The timing cycle may be a sequence of timing pulses or sequence of time statements. The third unit 3 determines time slices of predefined length on the basis of the received timing cycle.

During a respective one of the time slices, the first unit 1 and the second unit 2 of the block formation device 10 perform the following steps exactly once:

In step S10, the first unit 1 selects a number of transactions to be confirmed from the provided unconfirmed transactions 41, 42, 43.

In step S20, the second unit 2 forms an unconfirmed block 61 from the selected transactions to be confirmed.

In particular, the second unit 2 can inspect the selected transactions 41, 42, 43 to be confirmed in terms of validity and can discard invalid transactions. In particular, the second unit 2 can form the unconfirmed block 61 in accordance with a consensus rule arranged in the distributed database system.

In particular, the second unit 2 can insert a proof value required by the consensus rule, such as for example a proof of work, into the unconfirmed block 61 to be formed.

The second unit 2 is guaranteed to conclude the formation of the unconfirmed block 61 within the respective time slice and provides the formed unconfirmed block 61 in the distributed database system (not shown). By way of example, the second unit 2 can transmit the formed unconfirmed block 61 to at least one further node device (not shown) of the distributed database system.

The block formation device 10 advantageously allows exactly one unconfirmed block to be formed within each time slice.

According to one development, the first unit 1 selects all of the unconfirmed transactions 41-43 provided in the distributed database system in the respective time slice. Accordingly, it is possible to ensure that all of the provided unconfirmed transactions are incorporated into the exactly one unconfirmed block within each time slice.

According to another development, the first unit 1 selects all of the unconfirmed transactions 41-43 provided in the distributed database system that satisfy a predetermined condition in the respective time slice. Accordingly, it is possible to ensure that at least all of those provided unconfirmed transactions that satisfy the predetermined condition are incorporated into the exactly one unconfirmed block within each time slice. By way of example, all of the unconfirmed transactions that are marked as time-critical, that are marked as a sensor value transaction or measured value transaction or control command smart contract, or the like, are selected.

Figure 3:
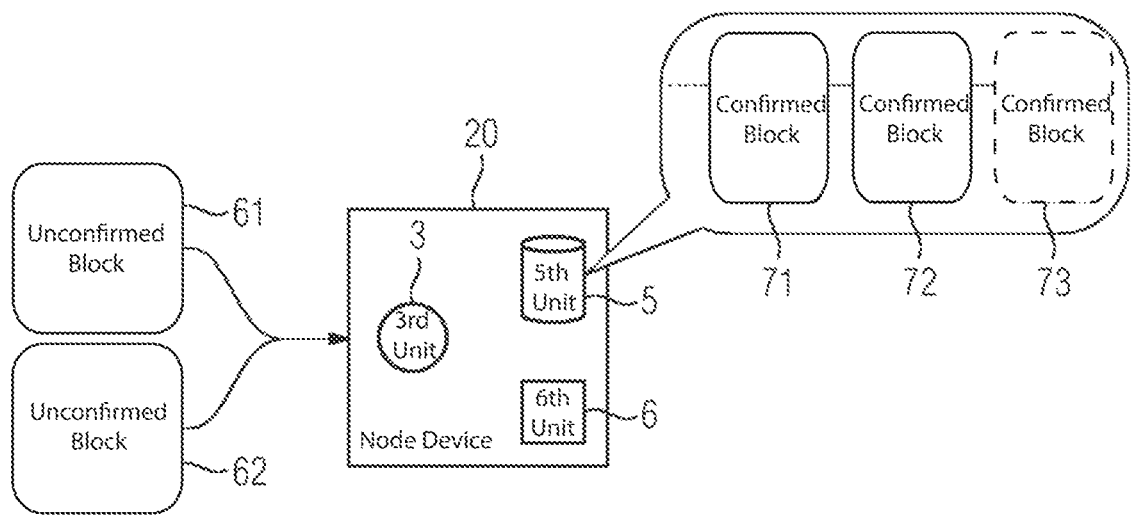
Figure 4:
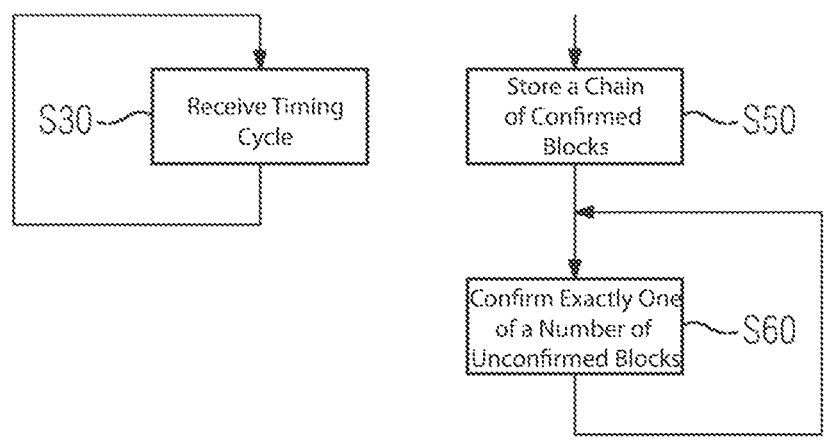

FIG. 3 schematically illustrates a node device 20 and FIG. 4 shows a flowchart for a block confirmation method according to a second exemplary embodiment. Reference is made to FIGS. 3 and 4.

The node device 20 has a third unit 3, a fifth unit 5 and a sixth unit 6. The fifth unit 5 stores a chain of previously confirmed blocks 71, 72, which represents a transaction ledger of a distributed database system (not shown). A number of unconfirmed blocks 61, 62 are provided in the distributed database system (not shown) to which the node device 20 belongs. The provision is effected for example by a number of block formation devices 10 in FIG. 1.

The node device 20 is configured so as to select a block to be confirmed from the unconfirmed blocks 61, 62 provided in the distributed database system and to confirm the selected block to be confirmed in timed fashion, so that the confirmed block 73 is appended to the chain of confirmed blocks 71, 72, 73.

Specifically, the third unit 3 is a time receiver. In step S30, the third unit 3 repeatedly or cyclically receives a timing cycle from a time source (not shown). The third unit 3 determines time slices of predefined length on the basis of the received timing cycle.

During a respective one of the time slices, the sixth unit 6 performs the following step exactly once:

In step S60, the sixth unit 6 selects exactly one of the unconfirmed blocks 61, 62 and confirms the selected block. This results in the selected block being appended as a confirmed block 73 to the chain of previously confirmed blocks 71, 72, so that the confirmed block 73 is appended to the chain of confirmed blocks 71, 72, 73.

The sixth unit 6 can in particular select the block to be confirmed from among the unconfirmed blocks 61, 62 provided in the respective time slice in accordance with a consensus rule of the distributed database.

In this instance the sixth unit 6 can in particular check each of the unconfirmed blocks 61, 62 provided in the respective time slice that are appendable to the chain of previously confirmed blocks 71, 72 in accordance with the consensus rule. If more than one of the unconfirmed blocks 61, 62 is checked successfully, the consensus rule can in this instance predefine criteria for the selection of one of the checked unconfirmed blocks 61, 62.

That one of the unconfirmed blocks 61, 62 that is supposed to be confirmed is appended by the sixth unit 6 to the chain of previously confirmed blocks 71, 72 and thus becomes a further confirmed block 73 in the chain of confirmed blocks 71, 72, 73. As a result, in particular the unconfirmed transactions of the block to be confirmed become transactions of the confirmed block 73 that are confirmed in the transaction ledger.

The sixth unit 6 is guaranteed to conclude step S60 within the respective time slice.

The node device 20 advantageously allows exactly one confirmed block to be appended to the chain of confirmed blocks within each time slice.

FIG. 5 schematically illustrates a node device 30 according to a development of the first and second exemplary embodiments.

The node device 30 comprises a block formation device 10 in FIG. 1 according to the first exemplary embodiment and the elements of the node device (20 in FIG. 3) according to the second exemplary embodiment. The third unit 3 is provided only once and, according to the present development, times both the operation of the first unit 1 and of the second unit 2 of the block formation device 10 and the operation of the sixth unit 6 of the node device 30. In other words, the node device 30 has in particular both functionality for forming unconfirmed blocks (for example mining functionality) and functionality for confirming unconfirmed blocks provided by block formation devices other than the block formation device 10 of the same distributed database system.

FIG. 6 illustrates a distributed database system 100 according to a third exemplary embodiment.

The distributed database system 100 comprises multiple node devices 20, 30, 31, 32 networked by a network 101. The node device 20 is a node device 20 according to the second exemplary embodiment, which only has functionality for confirming unconfirmed blocks. The node devices 30, 31 and 32 are node devices according to the development, which additionally comprise a respective block formation device 3010, 3110, 3210 (instances of the block formation device 10 from FIG. 1).

Each of the node devices 20, 30, 31, 32 has a respective third unit 203, 303, 313, 323. The other units of the node devices 20, 30, 31, 32 correspond to those of the first and second exemplary embodiments, but are not depicted for the sake of simplicity.

Each of the node devices 20, 30, 31, 32 uses its respective third unit 203, 303, 313, 323 to receive a timing cycle. The respectively received timing cycles are synchronous.

The distributed database system 100 is therefore advantageously operated in sync in accordance with a common timing cycle of the distributed database system 100; the respective first, second and sixth units of the respective node devices 20, 30, 31, 32 perform their respectively assigned steps S20, S30, S60 synchronously during the same respective time slice.

Figure 7:
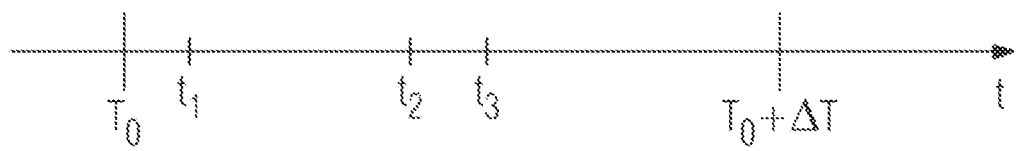
FIG. 7 illustrates a timing cycle of the distributed database system according to a variant of the third exemplary embodiment.

FIG. 7 illustrates a timing cycle of the distributed database system 100 according to a variant of the third exemplary embodiment. FIG. 7 is described by referring back to FIGS. 1, 3 and 6.

At a time T0, a time slice of a respective one of the node devices 20, 30, 31, 32 begins.

A first time period of the time slice begins at the time T0. During the first time period, each of the node devices 20, 30, 31, 32 can provide unconfirmed transactions 41, 42, 43 in the distributed database system 100.

By way of example, the node device 20 may be connected to an automation component of an industrial automation system and can create an unconfirmed transaction that represents a sensor value determined at the beginning of the time slice. The node device 32 can have a user interface and can for example provide an unconfirmed transaction that comprises a smart contract programmed by a user with control commands for the industrial automation system.

The distributed database system 100 is designed such that it is ensured that each provided unconfirmed transaction has reached all of the node devices 20, 30, 31, 32 in good time before the time t1 of the time slice.

Each of the block formation devices 3010, 3110, 3210 receives the provided unconfirmed transactions 41, 42, 43 and selects a number of transactions to be confirmed. For example at least all of the time-critical unconfirmed transactions can be selected. Unselected unconfirmed transactions 41, 42, 43 can be stored and kept for a later time slice or discarded.

The first time period, during which unconfirmed transactions 41, 42, 43 are provided and selected, ends at the time t1.

At the time t1, a second time period of the time slice begins. The node device 20 remains inactive during the second time period. The node devices 30, 31, 32 form in each case an unconfirmed block 60, 61 from the selected unconfirmed transactions 41, 42, 43 during the second time period, as described above on the basis of the first exemplary embodiment. Even though the formation of a block for a distributed database, for example operated according to blockchain technology, may be a time-consuming process, the consensus rule and the node devices 20, 30, 31, 32 of the distributed database system 100 are nevertheless configured such that the formation of the unconfirmed blocks 60, 61 is guaranteed to have concluded by the time t2 at which the second time period ends.

At the time t2, a third time period of the time slice begins. During the third time period, the block formation devices 3010, 3110, 3210 provide the unconfirmed block 61, 62 that they have formed in each case in the distributed database system 100, and the respective other node devices 20, 30, 31, 32 receive the provided unconfirmed blocks 61, 62. The provision and reception of the provided unconfirmed blocks ends at the time t3. The third time period ends at the time t3.

At the time t3, a fourth time period of the time slice begins. During the fourth period, the node devices 20, 30, 31, 32 confirm in each case exactly one of the unconfirmed blocks 60, 62 provided in the third time period, appending the confirmed block 73 to the chain of confirmed blocks that is stored in the fifth unit 6 of the respective node device 20, 30, 31, 32, as described above for the second exemplary embodiment. At the time T0+ΔT, the fourth time period ends and hence the time slice also ends.

In this way, the distributed database system 100 is operated in timed fashion and in sync, so that it can be ensured that a provided unconfirmed transaction 41, 42, 43 is transferred as a confirmed transaction to the representations of the transaction ledger of the distributed database system 100 of the respective node devices 20, 30, 31, 32 within a predefined period of time ΔT (length of a time slice).

FIG. 8 schematically illustrates the structure of an unconfirmed block 61 according to exemplary embodiments. It should be noted that the illustrated structure of an unconfirmed block 61 accordingly also holds for a respective confirmed block 71, 72, 73 (FIG. 3), and the latter is therefore not described again. The description is provided on the basis of FIG. 8 and by referring back to FIGS. 1, 3 and 6.

The unconfirmed block 61 is for example an unconfirmed block 61 that has been formed by the block formation device 10 (FIG. 1), and has the following structure:

The unconfirmed block 61 comprises a number of unconfirmed transactions 41, 42, 43 and a hash value 611, which is a Merkle root (root value of a cryptographic hash tree), for example, and protects the unconfirmed transactions 41, 42, 43 against subsequent manipulations.

Additionally, the unconfirmed block 61 can comprise an unconfirmed Coinbase transaction 40, provided that the consensus rule of the distributed database system 100 has provision therefor. The Coinbase transaction 40 is generated by the block formation device 10 itself and can grant the block formation device 10, or a node device 30 comprising it (FIG. 5), a predetermined remuneration for forming the block.

The unconfirmed block 61 optionally also comprises a timestamp 612 identifying the time slice in which the unconfirmed block 61 has been formed.

The unconfirmed block 61 comprises a concatenation hash value 613, which may be a cryptographic hash value of the last confirmed block of a representation of the transaction ledger of the distributed database system 100 that is known to the block formation device 10.

The unconfirmed block 61 additionally comprises a proof value 614, which, according to one example, is a nonce value representing what is known as a best-effort proof of work. In particular, the block formation device 10, once it has formed the unconfirmed block 61, can use remaining time up to the end of the second time period at the time t2 (FIG. 7) to determine the nonce value by trial and error such that a hash value of the whole unconfirmed block 61 is as extremal as possible, such as for example as low as possible.

In this way, the block formation device 10 can traceably document its legitimate interest in incorporating the block into the transaction ledger of the distributed database system 100. This proof of work, also called best-effort proof of work, can definitely be provided within the second time period t2.

A consensus rule of the distributed database system 100 will now be described more precisely on the basis of the unconfirmed block 61. The criteria described below for the consensus rule can be combined in a suitable manner. The criteria described below can be used by a respective node device 20, 30, 31, 32 of the distributed database system 100 to inspect a respective unconfirmed block 61, 62 during the fourth time period from t3 to T0+ΔT (FIG. 7) of the respective time slice and to select exactly one block to be confirmed from among all of the successfully inspected unconfirmed blocks 61, 62. The consensus rule is described by way of example on the basis of the node device 20 in FIG. 3 and the unconfirmed block 61 in FIG. 8. It goes without saying that the other node devices 30, 31, 32 operate in accordance with the same consensus rule.

One criterion of the consensus rule is in particular that the Merkle root 611 must correspond to a root value of a Merkle tree constructed from the unconfirmed transactions 41, 42, 43 of the unconfirmed block. In this way, it is possible to ensure that the unconfirmed block 61 was not modified in unauthorized fashion during the provision.

One criterion of the consensus rule is in particular that the concatenation hash value 611 must be a valid hash value of the last or of a preceding block in the chain of confirmed blocks 71, 72, 73 that is stored in the fifth unit 5 of the node device 20. In this manner, it is possible to determine whether and at what position the unconfirmed block 61 is appendable to the chain of confirmed blocks 71, 72, 73 or needs to be discarded.

One criterion of the consensus rule is in particular that each of the unconfirmed transactions 41, 42, 43 must be a valid transaction. A valid transaction can be understood to mean that the relevant transaction transfers a current state that as a result of the sequence of confirmed transactions of the representation of the transaction ledger of the distributed database system 100 that is stored in the fifth unit 5 to a new valid state. By way of example, one of the unconfirmed transactions 41, 42, 43 can be treated as a valid transaction 41, 42, 43 when a smart contract contained in the transaction or referenced by the transaction is executed correctly.

One criterion of the consensus rule may be in particular that the timestamp 612 of the unconfirmed block 61 denotes a time slice that matches the current time slice. In this manner, it is possible to monitor whether the timing of the distributed database system 100 is operating without interference.

One criterion of the consensus rule may be in particular that the unconfirmed block 61 must comprise all of the unconfirmed transactions 41, 42, 43 that were provided during the first time period between T0 and t1 (FIG. 7) and satisfy a predetermined condition. Expressed another way, the node device 20 can also receive and keep the unconfirmed transactions 41, 42, 43 provided in the distributed network 100 during the respective time slice in order to be able to check later during the same time slice whether all of the undetermined transactions that satisfy the condition have been incorporated into the unconfirmed block 61 correctly. The predetermined condition can be for example that all of the unconfirmed transactions 40, 41, 42 that are marked as time-critical and/or relate to control commands, measured values or control values of an industrial automation system need to be incorporated. This allows the real-time capability of the distributed database system 100 to be ensured.

The aforementioned criteria can be applied by the respective node device 20, 30, 31, 32 in order to discard unconfirmed blocks 61 that do not meet at least one of the aforementioned criteria as invalid. Other criteria cited below can be used in order to select the block that is confirmed from among multiple valid, inspected unconfirmed blocks 61, 62.

One criterion of the consensus rule may be in particular that the unconfirmed block 61, 62 that comprises the highest possible number of unconfirmed transactions 41, 42, 43, or unconfirmed transactions 41, 42, 43 of a particular type, is selected. In this way, an incentive to improve the transaction throughput and/or the real-time capability of the distributed database 100 can be provided.

One criterion of the consensus rule may be in particular that the unconfirmed block 61, 62 having the best proof value 614 is selected. As such, for example the unconfirmed block 61, 62 whose hash value, which also includes the proof value 614, is particularly extremal, such as for example is lowest, is highest, or has the highest possible number of leading binary zeros or leading binary ones, can be selected. In this way, a competition situation between multiple unconfirmed blocks 61, 62 can advantageously be resolved and an incentive for the block formation devices 10 of the distributed network 100 to provide the best possible best-effort proof of work can be provided.

The criterion described above may be modified in particular such that, besides the quality of the proof value 614, a quality or computational complexity of the unconfirmed transactions 41, 42, 43 contained in the unconfirmed block 61, 62 is also taken into consideration. As such, for example one unconfirmed block 61 can be used over another unconfirmed block 62 even if the unconfirmed block 61 contains a less significant proof value 614 than the other unconfirmed block 62 (if the hash value of the unconfirmed block 61 is less extremal than the hash value of the other unconfirmed block 62), but if the unconfirmed block 61 comprises a correspondingly higher number of computationally complex unconfirmed transactions 41, 42, 43. A computationally complex unconfirmed transaction 41, 42, 43 can be understood to mean a transaction whose checking during the formation of the unconfirmed block 61 generates a high processing load on the relevant block formation device 10, or takes up a large amount of processing time on the relevant block formation device 10. In this way, it is advantageously possible to prevent a block formation device 10 that incorporates many computationally complex transactions 41, 42, 43 into an unconfirmed block 61, and that therefore has only little remaining processing time within the second time period between t1 and t2 (FIG. 7) for determining the proof value 614 before the end of the second time period, from being put at a disadvantage.

FIG. 9 illustrates a transaction ledger of the distributed database system 100 according to a variant of the third exemplary embodiment.

FIG. 9 shows a chain of confirmed blocks 71, 72, 73, as may be stored in the fifth unit (FIG. 3) of a respective node device 20, 30, 31, 32 (FIG. 6) of the distributed database network 100 (FIG. 6). The chain of confirmed blocks 71, 72, 73 represents a transaction ledger of the distributed database network 100 (FIG. 6). Reference is made to FIG. 9 and FIG. 6 below.

Each of the confirmed blocks 71, 72, 73 comprises a proof value 714, 724, 734, a concatenation hash value 713, 723, 733, a timestamp 712, 722, 732, a Merkle root 711, 721, 731 and respective unconfirmed transactions 50-53, 54-56, 57-59. The elements correspond to the applicable elements of the unconfirmed block 61 which were described on the basis of FIG. 8.

As shown in FIG. 9, the blocks 71, 72, 73 are concatenated by the concatenation hash values 713, 723, 733 such that a respective subsequent block 72, 73 comprises a concatenation hash value 713, 723, 733 of the respective preceding block 71, 72. As such, the blockchain can be protected against manipulations.

FIG. 9 additionally shows a time axis that denotes the starting times T0, T0+ΔT, T0+2ΔT of respective time slices. The confirmed block 71 was formed and confirmed in the time slice associated with the time T0. The confirmed block 72 was formed in the time slice from T0+ΔT. The confirmed block 73 was formed in the time slice from T0+2ΔT. Accordingly, the timestamp 712 of the confirmed block 71 contains the value "T0", the timestamp 722 contains the value "T0+ΔT" and the timestamp 732 contains the value "T0+2ΔT".

As can be seen in FIG. 9, in each case exactly one confirmed block is appended to the transaction ledger at predefined time intervals ΔT in the distributed database network 100.

FIG. 10 illustrates a distributed database system 100 according to a fourth exemplary embodiment. The description of FIG. 10 is provided by referring back to FIGS. 1, 3 and 6. The distributed database system 100 according to the fourth exemplary embodiment that is shown in FIG. 10 corresponds to the distributed database system 100 according to the third exemplary embodiment that is shown in FIG. 6, and identical elements are not described again. Only differences of the fourth exemplary embodiment are discussed below by referring to FIG. 10, FIG. 6, FIG. 3 and FIG. 1.

The distributed database system 100 according to the fourth exemplary embodiment has a central time source 7 provided in the network 101. The respective third unit 203, 303, 313, 323 is configured to receive the timing cycle from the central time source 7. The time source 7 may be a DCF77 time transmitter, an NTP or PTP server or a timer of an industrial automation system. In this way, the respective timing cycle of the node devices 20, 30, 31, 32 can be kept synchronous particularly easily.

The distributed database system 100 according to the fourth exemplary embodiment also has a scheduling device 8 provided in the network 101. The scheduling device 8 receives the timing cycle from the central time source 7 in the same way as the third units 303, 313, 323 and takes the timing cycle as a basis for determining respective time slices of the predefined length.

The respective block formation device 3010, 3110, 3210 additionally has a fourth unit 304, 314, 324 besides the respective first unit 1 and the respective second unit 2.

At the beginning of a respective time slice, the scheduling device 8 sends a scheduling signal to exactly one fourth unit 304, 314, 324 of exactly one of the block formation devices 3010, 3110, 3210. The scheduling device 8 can select the exactly one block formation device 3010, 3110, 3210 in turn, at random or according to a different schedule.

The block formation devices 3010, 3110, 3210 according to the fourth exemplary embodiment are configured such that their respective first unit 1 and the second unit 2 perform the steps S10 and S20 described on the basis of the first exemplary embodiment (FIG. 2) in the respective time slice only if the fourth unit 304, 314, 324 of the relevant block formation device 3010, 3110, 3210 receives the activation signal from the scheduling device 8. Otherwise, the first unit 1 and the second unit 2 remain inactive in the respective time slice, in which an activation signal was not received.

Accordingly, advantageously only exactly one unconfirmed block 61 is formed per time slice, a competition situation between multiple unconfirmed blocks 61, 62 can be avoided when the unconfirmed blocks 61, 62 are confirmed by the respective node devices 20, 30, 31, 32, and a best-effort proof of work can be dispensed with. Instead, a proof of stake can be used as proof value or a permissioned ledger can be used, for example.

To increase security, in this case the respective node device 20, 30, 31, 32 can apply the additional criterion of the consensus rule that an unconfirmed block 61 is successfully inspected and confirmed only if the unconfirmed block 61 has been provided by the block formation device 3010, 3110, 3210 activated in the relevant time slice.

Although embodiments of the present invention have been described on the basis of exemplary embodiments, it is modifiable in a wide variety of ways.

For the sake of simplicity, only the basic principle of a distributed database system on a blockchain basis with a transaction ledger and concatenated blocks that each comprise multiple transactions has been described. The teaching of the timed formation and confirmation of blocks that has been disclosed in the present case is also applicable to other distributed database systems and developments of blockchain-based database systems, however, such as for example distributed database systems having multiple transaction ledgers, such as a main ledger and a side ledger, other types of concatenation such as for example directed graphs or blockless transaction chains, and the like.

The distributed database network 100 of the third exemplary embodiment may have provision for a central time source 7. The distributed database network 100 of the fourth embodiment may also have provision for no central time source 7.

Consensus formation techniques such as best-effort proof of work, proof of stake, permissioned ledger and the like can be combined as desired so long as the proof value 614 can be generated by the block formation device 10 with a guarantee within the time period provided therefor in the respective time slice.

A Merkle root was described on the basis of FIG. 6, but a Patricia root and other types of hash values, hash trees and other types of cryptographic securing of a block and/or of individual transactions against manipulations are also conceivable.

A conceivable subdivision for a time slice was described on the basis of FIG. 7, and it was recorded that all of the node devices 20, 30, 31, 32 are timed in sync such that a respective time slice begins at the same time on all of the node devices 20, 30, 31, 32. Other embodiments are also conceivable, however, in which the respective timing cycle of the node devices 20, 30, 31, 32 is in sync in another way and/or the respective time slice is subdivided differently. By way of example, the timing cycle of different node devices could be offset with respect to one another by a fraction of the predefined length ΔT; in this way, for example a higher level of parallelization could be attained without a phase of inactivity on individual node devices 20.

The proposed solution can be understood as a block formation device and a node device for a distributed database system, in each case with a unit for receiving a timing cycle from a time source and determining time slices of predefined length on the basis of the timing cycle, wherein the block formation device selects transactions to be confirmed from unconfirmed transactions provided in the database system exactly once within a respective time slice, forms an unconfirmed block from the selected unconfirmed transactions and provides the unconfirmed block in the database system, and the node device stores a chain of confirmed blocks representing a transaction ledger of the database system and, within a respective time slice, confirms exactly one of the unconfirmed blocks provided in the database system in the time slice, and appends the block to the chain of confirmed blocks, exactly once.

Particularly advantageously, the proposed solution can be applied to an industrial automation system that comprises a number of automation components operable according to a timing cycle. A proposed distributed database system, such as for example the distributed database system 100 according to one of the exemplary embodiments, may be configured by smart contracts implementing control logic and interface devices forming an interface between the node devices of the distributed database system and the automation components of the automation system, and the like, so as to control and/or regulate the number of automation components. A respective interface device may be configured so as to prompt a measured value from a respective automation component to be provided to the database system 100 as an unconfirmed transaction or to prompt a control value from a transaction confirmed in the distributed database system 100 to be provided to the respective automation component. This can involve a timer of the automation system being used as the central time source (7 in FIG. 10) of the distributed database system. A timing cycle of the distributed database system can therefore be produced that is synchronous with the timing cycle of the number of automation components or an integer multiple thereof. It is therefore advantageously possible for measured values and/or control values to be confirmed in the form of transaction data records in the distributed database system in the same cycle as that in which they are delivered by the automation components or need to be output thereto. Real-time control of the industrial automation system can therefore be implemented using a distributed database based on blockchain technology.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A block formation device for a distributed database system comprising a number of node devices, comprising:
a first unit for selecting a number of transactions to be confirmed from a number of unconfirmed transactions provided in the distributed database system;
a second unit for forming an unconfirmed block from the selected number of unconfirmed transactions, wherein a respective selected unconfirmed transaction is inspected in terms of validity and discarded in the event of a failed inspection, and otherwise is incorporated into the unconfirmed block, and for providing the unconfirmed block in the distributed database system; and
a third unit for receiving a timing cycle from a time source and for determining time slices of a predefined length on the basis of the timing cycle; wherein the first unit and the second unit are configured so as to perform the selection, the formation and the provision exactly once within a respective time slice.

2. The block formation device according to claim 1, wherein the first unit is configured, during the respective time slice, so as to select all of the unconfirmed transactions provided in the distributed database system that correspond to a predefined condition as transactions to be confirmed.

3. The block formation device according to claim 1, wherein a fourth unit for receiving an activation signal, wherein the first unit and the second unit are configured so as to perform the selection, the formation and the provision exactly once within the respective time slice only when the fourth unit receives the activation signal in the respective time slice.

4. The block formation device according to claim 1, wherein the second unit is configured so as to record, in the block that is formed, a cryptographic proof of work that it is best able to determine within the respective time slice.

5. The block formation device according to claim 1, wherein the second unit is configured so as to record, in the block that is formed, a timestamp that identifies the respective time slice.

6. A node device for a distributed database system comprising a number of node devices, comprising:
a storing unit for storing a chain of confirmed blocks that represent at least one section of a transaction ledger of the distributed database system;
a selecting unit for confirming exactly one of a number of unconfirmed blocks provided in the respective time slice in the distributed database system, such that the confirmed block is appended to the chain of confirmed blocks, wherein the confirmation of the exactly one of the number of unconfirmed blocks comprises inspecting one or more of the number of unconfirmed blocks, selecting one of the successfully inspected unconfirmed blocks and appending the selected block, as the confirmed block, to the chain of confirmed blocks; and
a time receiver unit for receiving a timing cycle from a time source and determining time slices of a predefined length on the basis of the timing cycle; wherein the selecting unit is configured so as to perform the confirmation and the appendage exactly once within a respective time slice.

7. The node device according to claim 6, wherein the selecting unit is configured so as to select the exactly one block for confirmation on the basis of at least one of the following criteria:
number and type of transactions contained in the block;
quality of a cryptographic proof of work contained in the block;
quality and/or computational complexity of a respective transaction contained in the block;
match between a timestamp contained in the block and the respective time slice; and/or
whether a block formation device that provided the block is a block formation device for which an activation signal transmitted in the distributed database system during the respective time slice is determined.

8. The node device according to claim 6, wherein
the selecting unit is configured so as to select the exactly one block for confirmation on the basis of a criterion as to whether the block contains all of the unconfirmed transactions provided in the distributed database system during the respective time slice that correspond to a predefined condition.

9. The node device according to claim 6, wherein the node device has a block formation device.

10. A distributed database system, comprising a number of node devices according to claim 6 that are configured so as to jointly manage the transaction ledger of the distributed database system, wherein at least one of the node devices comprises a block formation device and the number of node devices are able to be operated synchronously in time in accordance with a timing cycle of the distributed database system.

11. The distributed database system according to claim 10, wherein the distributed database system furthermore comprises a central time source, wherein the time source from which the time receiver unit of the respective node device receives the timing cycle is the central time source.

12. An industrial automation system comprising a distributed database system according to claim 10 and a number of automation components able to be operated in accordance with a timing cycle, wherein the distributed database system is able to be operated so as to regulate and/or control the number of automation components, wherein the timing cycle of the distributed database system is synchronous with the timing cycle of the number of automation components or an integer multiple of the timing cycle of the number of automation components.

13. A block formation method for a distributed database system comprising a number of node devices, comprising:
    selecting a number of transactions to be confirmed from a number of unconfirmed transactions provided in the distributed database system;
    forming an unconfirmed block from the selected number of unconfirmed transactions, wherein a respective selected unconfirmed transaction is inspected in terms of validity and discarded in the event of a failed inspection, and otherwise is incorporated into the unconfirmed block, and providing the unconfirmed block in the distributed database system; and
    receiving a timing cycle from a time source and determining time slices of a predefined length on the basis of the timing cycle; wherein the selection, the formation and the provision take place exactly once within a respective time slice.

14. The block confirmation method for a distributed database system comprising a number of node devices, comprising:
    storing a chain of confirmed blocks that represent a main ledger of a distributed database;
    confirming exactly one of a number of unconfirmed blocks provided in the respective time slice in the distributed database system, wherein the confirmed block is appended to the chain of confirmed blocks, wherein the confirmation of the exactly one of the number of unconfirmed blocks comprises inspecting one or more of the number of unconfirmed blocks, selecting one of the successfully inspected unconfirmed blocks and appending the selected block, as the confirmed block, to the chain of confirmed blocks; and
    receiving a timing cycle from a time source and determining time slices of a predefined length on the basis of the timing cycle;
wherein the confirmation takes place exactly once within a respective time slice.

15. A computer program product, comprising a computer readable hardware storage device having computer readable program code stored therein, said program code executable by a processor of a computer system to implement a method that prompts a program-controlled device to perform a method according to claim 13.

* * * * *